United States Patent
Kawaguchi et al.

(10) Patent No.: US 9,785,117 B2
(45) Date of Patent: Oct. 10, 2017

(54) MOTOR DRIVE DEVICE AND ELECTRONIC TIMEPIECE

(71) Applicant: CASIO COMPUTER CO., LTD., Tokyo (JP)

(72) Inventors: Yohei Kawaguchi, Tokyo (JP); Fumiaki Ochiai, Tokyo (JP); Yuta Saito, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/214,695

(22) Filed: Jul. 20, 2016

(65) Prior Publication Data
US 2017/0038736 A1  Feb. 9, 2017

(30) Foreign Application Priority Data

Aug. 6, 2015 (JP) .................................. 2015-156501

(51) Int. Cl.
*G04C 3/14* (2006.01)
*H02P 8/02* (2006.01)
(Continued)

(52) U.S. Cl.
CPC .............. *G04C 3/14* (2013.01); *G04C 3/143* (2013.01); *H02P 8/02* (2013.01); *H02P 8/12* (2013.01); *H02P 8/32* (2013.01)

(58) Field of Classification Search
CPC ........... G04C 3/143; G04C 3/146; H02P 8/02; H02P 8/12; H02P 8/32; H02P 8/36; H02P 8/38
See application file for complete search history.

(56) References Cited

U.S. PATENT DOCUMENTS

| 4,460,282 A | * | 7/1984 | Kanno | G04C 3/143 318/696 |
| 5,973,469 A | * | 10/1999 | Higuchi | H02P 6/20 318/254.1 |
| RE40,370 E | * | 6/2008 | Sato | G04C 3/146 318/685 |

(Continued)

FOREIGN PATENT DOCUMENTS

| JP | H9-266697 A | 10/1997 |
| JP | 2012-8010 A | 1/2012 |

(Continued)

OTHER PUBLICATIONS

Japanese Office Action dated May 30, 2017, in a counterpart Japanese patent application No. 2015-156501. (A machine translation (not reviewed for accuracy) attached.)

*Primary Examiner* — Vit W Miska
(74) *Attorney, Agent, or Firm* — Chen Yoshimura LLP

(57) ABSTRACT

A motor drive device includes a driver unit configured to be connected to a stepping motor, and a controller connected to the driver unit. The controller causes the driver unit to output a drive pulse to the stepping motor for causing the stepping motor to rotate stepwise in a prescribed rotation direction. The controller detects, through the driver unit, a current induced by a counter-electromotive force generated in the stepping motor in response to the drive pulse. The controller causes the driver unit to apply a counter pulse having the same electrical polarity as the drive pulse to the stepping motor so as to suppress an amount of the current induced by the counter-electromotive force when the stepping motor is not rotating in response to the drive pulse so that the amount of the induced current detectably differs between when the stepping motor is rotating and not rotating.

10 Claims, 26 Drawing Sheets

(51) Int. Cl.
*H02P 8/32* (2006.01)
*H02P 8/12* (2006.01)

(56) References Cited

U.S. PATENT DOCUMENTS

| | | | | |
|---|---|---|---|---|
| 7,977,909 B2* | 7/2011 | Kasuo | ........................ | H02P 8/02 318/254.1 |
| 8,351,303 B2* | 1/2013 | Ogasawara | ......... | B60L 15/2009 318/696 |
| 9,182,746 B2* | 11/2015 | Yamamoto | ............. | G04C 3/143 |
| 2008/0089183 A1* | 4/2008 | Manaka | .................... | H02P 8/02 368/202 |
| 2010/0254226 A1* | 10/2010 | Ogasawara | ............ | G04C 3/143 368/80 |
| 2011/0080132 A1* | 4/2011 | Ogasawara | ................ | H02P 8/38 318/696 |
| 2011/0235472 A1* | 9/2011 | Hasegawa | .............. | G04C 3/143 368/80 |
| 2012/0307602 A1* | 12/2012 | Namekawa | ............ | G04C 3/143 368/204 |

FOREIGN PATENT DOCUMENTS

| | | |
|---|---|---|
| JP | 2014-195371 A | 10/2014 |
| WO | 2011/099536 A1 | 8/2011 |

* cited by examiner

MOTOR DRIVE DEVICE AND ELECTRONIC TIMEPIECE

BACKGROUND OF THE INVENTION

The present invention relates to a motor drive device and an electronic timepiece.

In stepping motors, the rotor must be reliably rotated to each step. Therefore, a drive controller for a stepping motor applies a drive pulse to rotate the rotor and then detects the counter-electromotive force (reverse voltage) generated due to damping when the rotor stops at a prescribed step angle in order to determine whether the rotor rotated (rotor rotation detection). If it is determined that the rotor did not rotate, an additional correction pulse is applied to rotate the rotor.

Rotation detection technology for single-coil clock motors has already been developed. For example, Japanese Patent Application Laid-Open Publication No. H9-266697 discloses the following: "Drive pulses supplied to a step motor are controlled using a chopper scheme in which the duty cycles of initial and final drive pulses are set lower than the duty cycle of interim drive pulses. This makes it possible to achieve a low effective power distribution in the initial and final drive pulses and a high effective power distribution in the interim drive pulses, thereby making it possible for the step motor to generate a torque equal to its own cogging torque.

This, in turn, reduces unnecessary power consumption during the initial and final drive pulses and makes it possible to rotate the rotor at low speeds, thereby making it possible to reduce overall power consumption when driving the step motor."

Another well-known conventional technology is dual-core stepping motors, which include two coils and can be rotated in either direction by applying drive pulses to the coils as appropriate. Rotation detection technology has not yet been developed for this type of dual-core motor. One possible rotation detection method would be to increase the impedance of one of the two coils in the dual-core motor to a high value during detection in order to increase the magnitude of the electromotive force needed to detect rotation, for example. However, with this type of simple approach, the electromotive force could potentially become large enough to be misdetected as rotation even when the rotor is not actually rotating, such as due to environmental factors including sample variation or high temperatures.

SUMMARY OF THE INVENTION

Therefore, the present invention aims to provide a motor drive device and an electronic timepiece that make it possible to prevent rotation misdetections when no rotation has occurred. The present invention is thus directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a motor drive device, including:

a driver unit configured to be connected to a stepping motor; and a controller connected to the driver unit, wherein the controller causes the driver unit to output a drive pulse to the stepping motor for causing the stepping motor to rotate stepwise in a prescribed rotation direction, wherein the controller detects, through the driver unit, a current induced by a counter-electromotive force generated in the stepping motor in response to the drive pulse, in order to determine whether the stepping motor is rotating as intended in response to the drive pulse, and wherein the controller causes the driver unit to apply a counter pulse having the same electrical polarity as the drive pulse to the stepping motor so as to suppress an amount of the current induced by the counter-electromotive force when the stepping motor is not rotating in response to the drive pulse so that the amount of the induced current detectably differs between when the stepping motor is rotating and when the stepping motor is not rotating.

It is to be understood that both the foregoing general description and the following detailed description are exemplary and explanatory, and are intended to provide further explanation of the invention as claimed.

DETAILED DESCRIPTION OF EMBODIMENTS

Next, an embodiment of the present invention will be described in detail with reference to figures.

Figure 1:
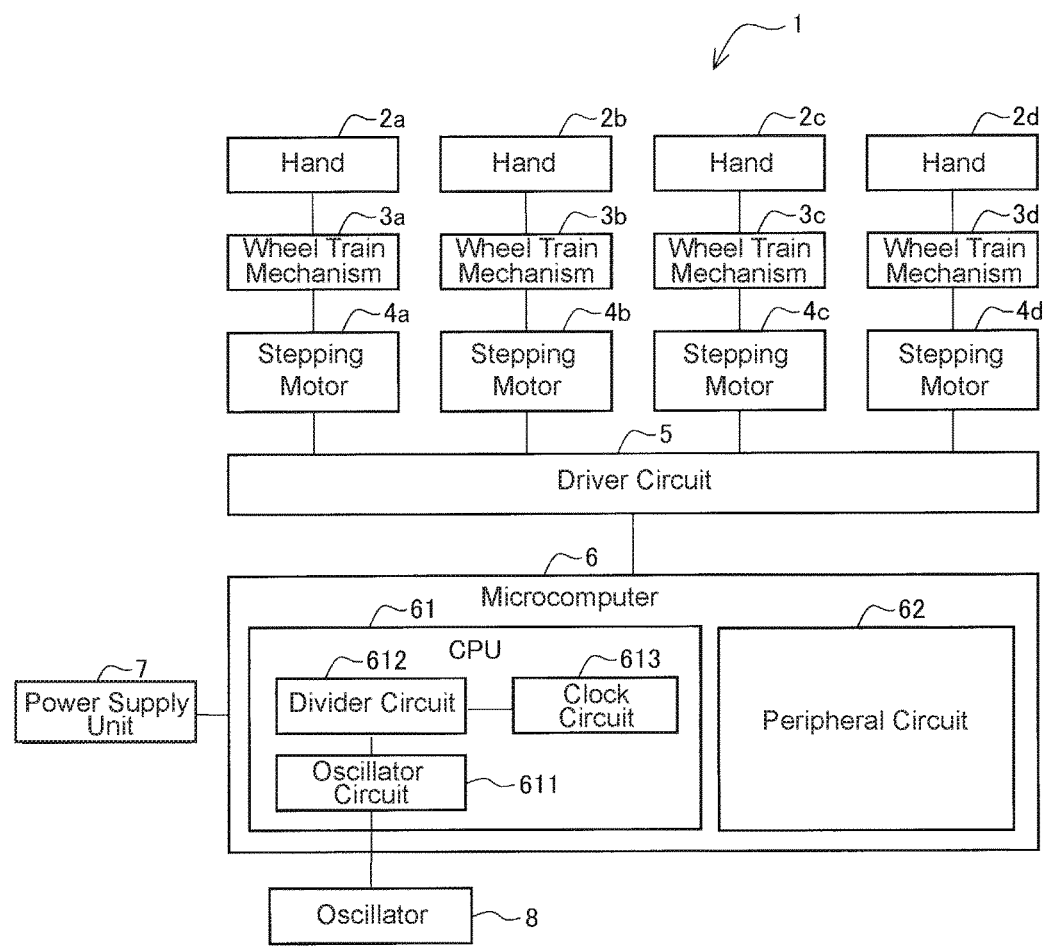
FIG. 1 is a block diagram schematically illustrating an electronic timepiece according to an embodiment of the present invention.

FIG. 1 is a block diagram schematically illustrating an electronic timepiece 1 according to the present embodiment.

In the analog electronic timepiece 1 according to the present embodiment, four indicator hands 2a to 2d can be independently driven by respective motors. Moreover, the electronic timepiece 1 is a wristwatch-style electronic timepiece that includes a band for attaching the timepiece to the arm, for example. Note, however, that the present embodiment is not particularly limited to this type of timepiece. The electronic timepiece 1 includes the indicator hands 2a to 2d, stepping motors 4a to 4d that respectively rotate the indicator hands 2a to 2d via wheel train mechanisms 3a to 3d, a driver circuit (driver unit) 5, a microcomputer 6, a power supply 7, and an oscillator 8.

In the following description, the indicator hands 2a to 2d will be collectively referred to as the indicator hands 2 when there is no particular need to distinguish therebetween. Similarly, the wheel train mechanisms 3a to 3d will be collectively referred to as the wheel train mechanisms 3 when there is no particular need to distinguish therebetween. Likewise, the stepping motors 4a to 4d will be collectively referred to as the stepping motors 4 when there is no particular need to distinguish therebetween.

The driver circuit 5 is a bridge circuit for driving the stepping motors 4, and together the driver circuit 5 and the microcomputer 6 form a motor drive device. The microcomputer 6 is a large-scale integrated circuit (LSI) and includes a central processing unit (CPU) 61 and a peripheral circuit 62. The CPU 61 includes an oscillator circuit 611, a frequency divider 612, and a clock circuit 613. Moreover, the oscillator circuit 611, the frequency divider 612, and the clock circuit 613 may be provided on a separate block from the CPU 61 within the microcomputer 6 or outside of the microcomputer 6 as separate devices.

The indicator hands 2a to 2d are rotatably attached to a rotary shaft on a dial. The wheel train mechanisms 3a to 3d rotate the indicator hands 2a to 2d, respectively.

The driver circuit 5 outputs drive voltage signals for driving the stepping motors 4a to 4d at the appropriate times according to control signals input to the microcomputer 6. The driver circuit 5 can adjust the drive voltage and the drive voltage pulse width in the drive signals sent to the stepping motor 4 according to setting signals from the microcomputer 6. The driver circuit 5 can also output drive voltage signals that make the stepping motors 4 rotate in either a forward or a reverse direction.

The CPU 61 performs various types of calculation processes to control the overall behavior of the electronic timepiece 1. The CPU 61 loads and executes control programs, continuously makes all of the components perform the operations needed to display the time, and executes requested behaviors either in real time or at the specified time according to user input to an operation module (not illustrated in the figure). The CPU 61 is a control unit that sets the target positions to which to rotate the indicator hands 2 and drives the stepping motors 4 via the driver circuit 5 accordingly.

The oscillator circuit 611 generates a signal of a characteristic frequency and outputs that signal to the frequency divider 612. The oscillator circuit 611 is a circuit that produces an oscillating signal and is provided together with an oscillator 8 made from a material such as a crystal, for example.

The frequency divider 612 divides the signal input from the oscillator circuit 611 into output signals of the frequencies used by the CPU 61 and the clock circuit 613.

The clock circuit 613 is a counter circuit that counts the number of pulses in the signal of the prescribed frequency input from the frequency divider 612 and adds the counted value to an initial time in order to calculate the current time. The CPU 61 reads the current time calculated by the clock circuit 613 and uses that current time to display the time. The time calculation process may alternatively be implemented as a software-based scheme.

The power supply 7 keeps the electronic timepiece 1 operating continuously and stably for a long period of time and is constituted by a battery and a DC-DC converter, for example. This configuration makes it possible to maintain the output voltage of the power supply 7 at a prescribed value during operation.

Figure 2:
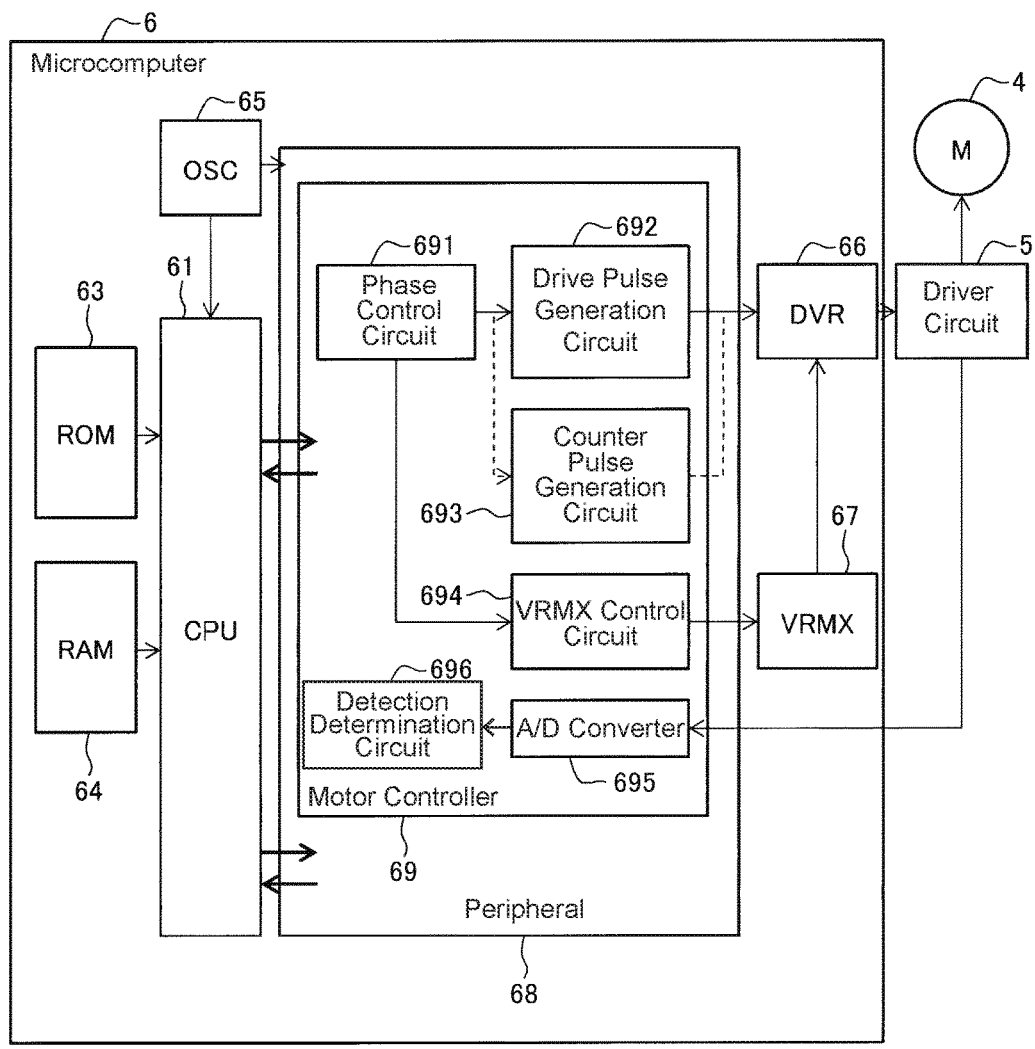
FIG. 2 is a block diagram schematically illustrating a microcomputer.

FIG. 2 is a block diagram schematically illustrating the microcomputer 6 (an LSI circuit).

The microcomputer 6 includes the CPU 61, a read-only memory (ROM) 63, a random-access memory (RAM) 64, an oscillator (OSC) 65, a peripheral device 68, a VRMX 67, and a DVR 66.

The ROM 63 stores various control programs and initial configuration data. The CPU 61 loads the control programs (not illustrated in the figures) when the analog electronic timepiece 1 is turned on and continuously executes the control programs.

The RAM 64 is a volatile memory unit such as SRAM or DRAM and functions as a working memory region for the CPU 61. The RAM can also temporarily store data such as user-configured data set according to user inputs to the operation module. Moreover, a portion of the RAM may be non-volatile memory such as flash memory or electrically erasable and programmable read-only memory (EEPROM).

The OSC 65 generates a signal of a characteristic frequency and outputs that signal to components such as the CPU 61 and the peripheral device 68. The OSC 65 corresponds to the oscillator circuit 611 and the oscillator 8 in FIG. 1.

The DVR 66 drives the signals that drive the motors. The VRMX 67 is a regulator that generates power for the DVR 66.

The peripheral device 68 includes a motor controller 69 that includes a phase control circuit 691, a drive pulse generation circuit 692, a counter pulse generation circuit 693, a VRMX control circuit 694, an A/D converter 695, and a detection determination circuit 696. Moreover, the motor controller 69, the DVR 66, and the VRMX 67 may be provided as separate devices from the microcomputer 6.

The phase control circuit 691 controls a sequence of phases that include a drive pulse output phase and a counter pulse generation phase. The drive pulse generation circuit 692 outputs drive pulses to the motors, and the counter pulse generation circuit 693 outputs counter pulses or counter-electromotive force reduction pulses to the motors. The VRMX control circuit 694 controls the VRMX 67 in order to generate a prescribed supply voltage. The A/D converter 695 converts analog voltages from the driver circuit 5 to digital signals. The detection determination circuit 696 converts any negative values in the digital signal produced by the A/D converter 695 to positive values and determines whether the converted values are greater than a threshold value in order to determine whether the stepping motors 4 have rotated.

Figure 3:
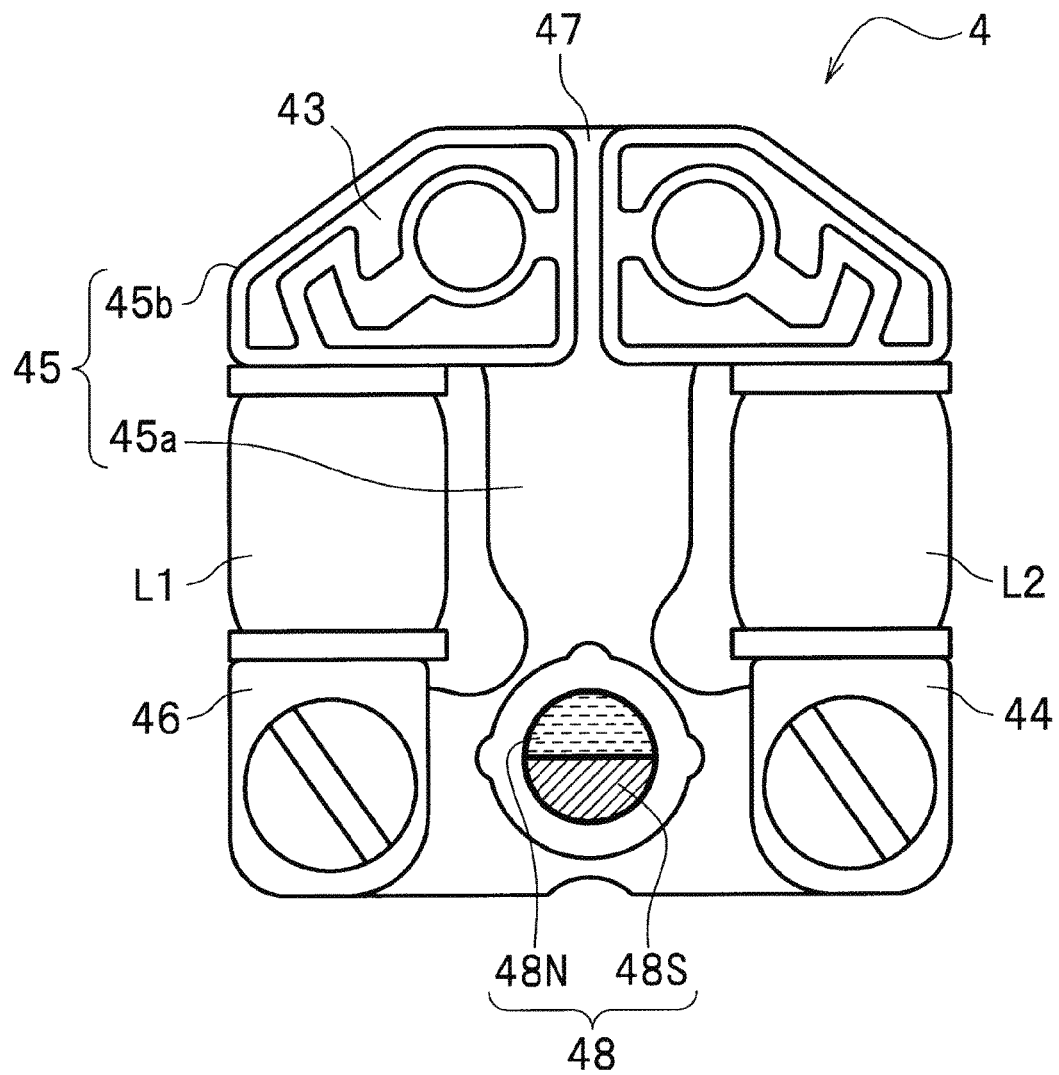
FIG. 3 is a plan view of a dual-core stepping motor.

FIG. 3 is a plan view of one of the dual-core stepping motors 4.

The stepping motor 4 includes a stator 47 and a rotor 48. The rotor 48 is disk-shaped and is supported such that it can rotate freely in the circumferential direction. Moreover, the rotor 48 includes a permanent dipole magnet with the poles arranged on opposite sides in the radial direction. The rotor 48 includes a N pole 48N (the lightly hatched portion) and a S pole 48S (the more heavily hatched portion). A suitable permanent magnet such as a rare earth magnet (a samarium-cobalt magnet, for example) is used for the rotor 48, for example, but the rotor 48 is not limited to this type of magnet.

The rotor 48 is rotatably supported at the center thereof by a shaft (not illustrated in the figure) formed in the stator 47. Moreover, in the present embodiment, the rotor 48 can be rotated in either a clockwise direction or a counterclockwise direction to a prescribed step angle by applying drive pulses to coils L1 and L2 (which will be described later). When the stepping motors 4 are used in a timepiece, for example, the stepping motors 4 may be connected to wheels in the wheel train mechanisms 3 for rotating the indicator hands 2 of the timepiece such that rotating the rotors 48 causes the wheels and the like to rotate.

The stator 47 includes a center yoke 45, a pair of side yokes 44 and 46, and coils L1 and L2. The center yoke 45 includes a straight portion 45a and a protruding portion 45b that protrudes out in a substantially vertically symmetric manner on one end of the straight portion 45a, such that the center yoke 45 is substantially T-shaped overall. The pair of side yokes 44 and 46 are arranged surrounding the rotor 48 in a substantially left-right symmetric manner. Furthermore, the coils L1 and L2 are arranged between the protruding portion 45b of the center yoke 45 and the side yokes 44 and 46, and the coils L1 and L2 are connected to the driver circuit 5 (see FIG. 1) via a terminal block 43.

In the stator 47, a substantially circular hole is formed at the intersection between the center yoke 45 and the pair of side yokes 44 and 46, and the rotor 48 is arranged inside this hole. When the stator 47 is excited, three magnetic poles are formed around the periphery of the rotor 48: one near the center yoke 45, one near the side yoke 44, and one near the side yoke 46. Moreover, applying drive pulses to the coils L1 and L2 switches the polarity of the three magnetic poles of the stator 47.

One end of the coil L1 is magnetically coupled with the protruding portion 45b of the center yoke 45, and the other end of the coil L1 is magnetically coupled with the free end of the side yoke 46. Similarly, one end of the coil L2 is magnetically coupled with the protruding portion 45b of the center yoke 45, and the other end of the coil L2 is magnetically coupled with the free end of the side yoke 44.

In the present embodiment, the motor controller 69 applies drive pulses to the coils L1 and L2. This causes the coils L1 and L2 to generate a magnetic flux that flows through the magnetic core of the coil L1 and along the stator 47 that is magnetically coupled therewith, thereby switching the polarity of the three magnetic poles as appropriate.

Furthermore, three recesses are formed in the inner peripheral face of the hole in the stator 47 that houses the rotor 48. One of the three recesses is formed towards the center yoke 45, and the other two recesses are formed in the two directions orthogonal to the first recess. These three recesses make it possible to maintain the rotor 48 in a static state.

In the present embodiment, the stepping motor 4 generates the strongest holding torque when the two poles of the rotor 48 are facing in the two directions orthogonal to the center yoke 45. Therefore, when no drive pulses are applied and no current is flowing through the stator 47, the rotor 48 is maintained in the magnetically stable position illustrated in FIG. 3 (or the position rotated by 180° therefrom).

The operation of the stepping motor 4 will be described later in more detail with reference to FIGS. 5, 6, and 7.

Figure 4:
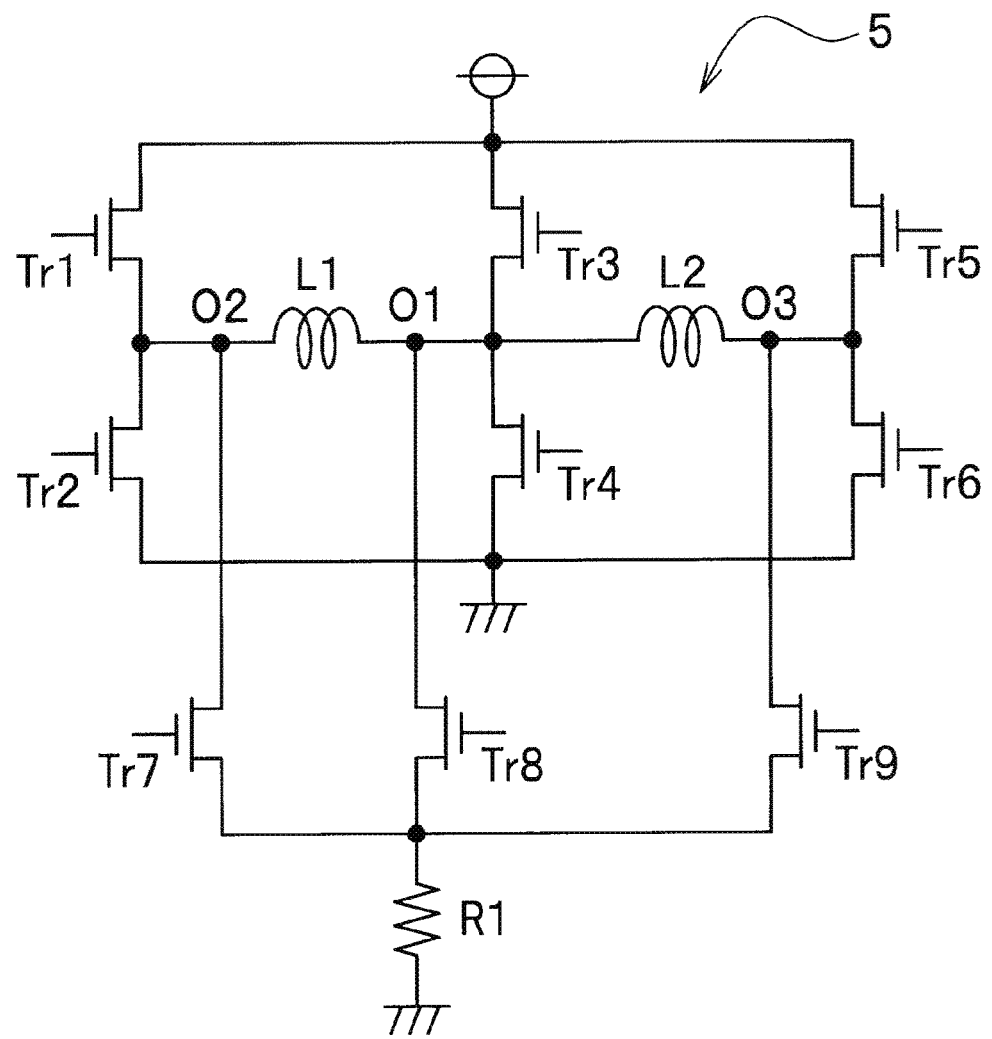
FIG. 4 is a circuit diagram illustrating a driver circuit.

FIG. 4 is a circuit diagram illustrating the driver circuit 5.

The driver circuit 5 is an H bridge circuit that includes metal-oxide-semiconductor field-effect transistor (MOS-FET) switching elements Tr1 to Tr9 and applies drive pulses to the two coils L1 and L2.

In the driver circuit 5 according to the present embodiment, a motor driver circuit for the coil L1 is connected in parallel to a motor driver circuit for the coil L2, and the switching elements Tr3 and Tr4 are shared between the two motor driver circuits.

The power supply 7 (see FIG. 1) applies a supply voltage Vcc between a power supply terminal and a ground terminal of the driver circuit 5. Furthermore, between a voltage terminal and the ground terminal, the switching elements Tr1 and Tr2 are connected in series via a connection point O2, the switching elements Tr3 and Tr4 are connected in series via a connection point O1, and the switching elements Tr5 and Tr6 are connected in series via a connection point O3. Moreover, the coil L1 of the stepping motor 4 is connected between the connection points O2 and O1, and the coil L2 is connected between the connection points O1 and O3.

Furthermore, one end of the switching element Tr7 is connected to the connection point O2, one end of the switching element Tr8 is connected to the connection point O1, and one end of the switching element Tr9 is connected to the connection point O3. The other ends of the switching elements Tr7 to Tr9 are all grounded via a single resistor R1. The A/D converter 695 (see FIG. 2) is connected to the connection point between the other ends of the switching elements Tr7 to Tr9 and the resistor R1. This makes it possible to detect the voltage applied to the resistor R1.

The operation of the driver circuit 5 will be described later in more detail with reference to FIGS. 9, 12, and 14.

FIGS. 5A to 5H illustrate what happens when the dual-core motor rotates. The sequence depicted in FIG. 5 corresponds to a case in which the rotor 48 rotates in the forward (counterclockwise) direction and the impedance of the coil L2 of the dual-core motor is increased in order to increase the magnitude of the electromotive force, which is needed to detect rotation.

Figure 5A:
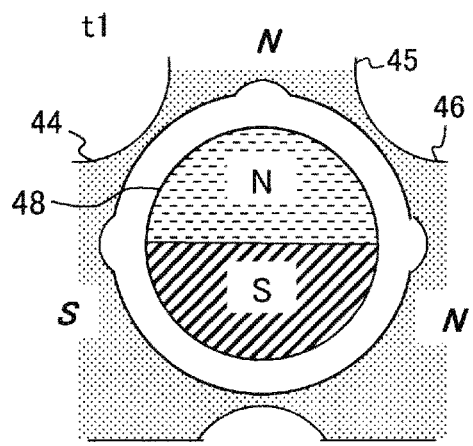
FIGS. 5A to 5H illustrate how the dual-core motor rotates.

In the following description, the orientation in which the N pole of the rotor 48 is closest to the center yoke 45 (as illustrated in FIG. 5A) is assumed to be the initial position (rotation angle=0°), and all subsequent rotation angles are calculated relative to this initial state. Moreover, magnetic poles resulting from applying a drive pulse to the coil L1 are indicated by an italic "N" or "S", and magnetic poles excited due to rotation of the rotor 48 are indicated by a normal "N" or "S".

Figure 8:
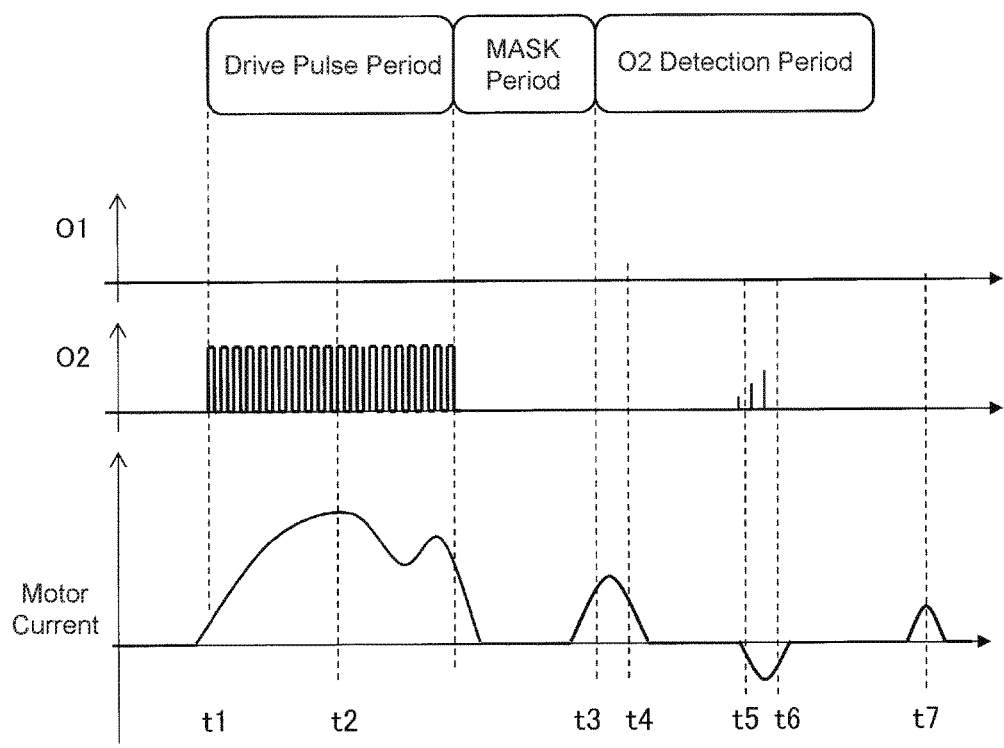
FIG. 8 is a waveform diagram for a driver circuit used in a control scheme according to the comparison example.

FIG. 5A illustrates the state of the stepping motor 4 at time t1 (see FIG. 8). In this state, the N pole of the rotor 48 is oriented towards the center yoke 45. At this time, a drive pulse is applied to the coil L1, thereby creating a S pole in the side yoke 44 direction and creating N poles in the center yoke 45 and side yoke 46 directions. The N pole of the rotor 48 is repelled by the N pole in the side yoke 46 direction and attracted to the S pole in the side yoke 44 direction, and therefore the rotor 48 starts to rotate forward to the state illustrated in FIG. 5B.

Figure 5B:
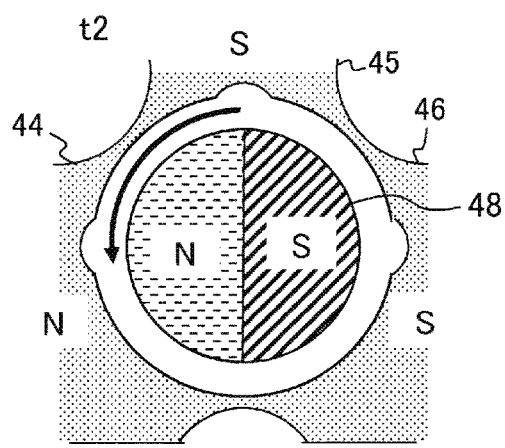

FIG. 5B illustrates the state of the stepping motor 4 at time t2 (see FIG. 8). In this state, the rotor 48 has rotated counterclockwise to a rotation angle substantially equal to 90°. The rotation of the rotor 48 excites a N pole in the side yoke 44 direction and excites S poles in the center yoke 45 and side yoke 46 directions, and the resulting change in magnetic flux and the counter-electromotive force generated thereby creates an induced current in the coil L1. The rotor 48 then proceeds to rotate from this state to the state illustrated in FIG. 5C.

Figure 5C:
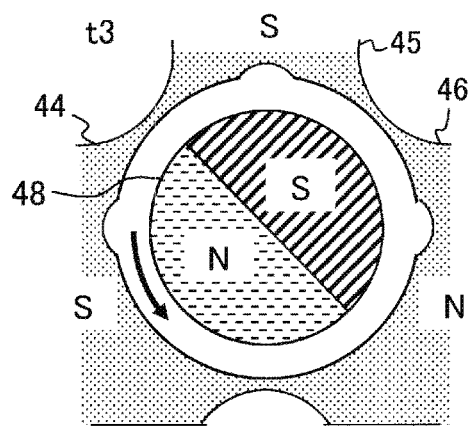

FIG. 5C illustrates the state of the stepping motor 4 at time t3 (see FIG. 8). In this state, the rotor 48 has rotated counterclockwise to a rotation angle substantially equal to 135°. The rotation of the rotor 48 excites S poles in the side yoke 44 and center yoke 45 directions and excites a N pole in the side yoke 46 direction, and the resulting change in magnetic flux and the counter-electromotive force generated thereby creates an induced current in the coil L1. The rotor 48 then proceeds to rotate from this state to the state illustrated in FIG. 5D.

Figure 5D:
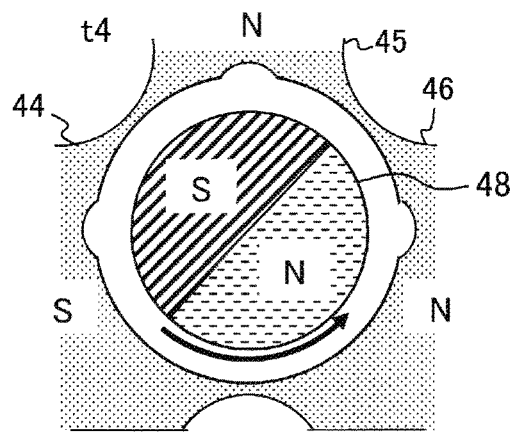

FIG. 5D illustrates the state of the stepping motor 4 at time t4 (see FIG. 8). In this state, the rotor 48 has rotated counterclockwise to a rotation angle substantially equal to 225° and has rotated past the stable point at 180°. The rotation of the rotor 48 excites a S pole in the side yoke 44 direction and excites N poles in the center yoke 45 and side yoke 46 directions, and the resulting change in magnetic flux and the counter-electromotive force generated thereby creates an induced current in the coil L1. The rotor 48 then proceeds to rotate from this state to the state illustrated in FIG. 5E.

Figure 5E:
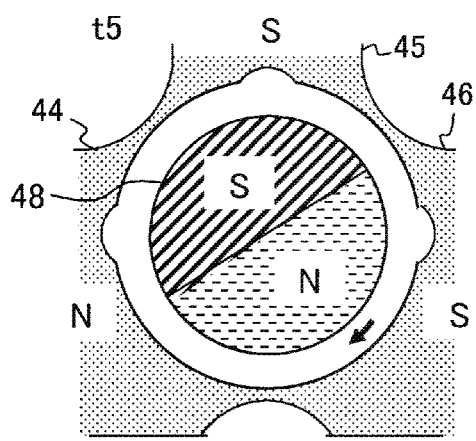

FIG. 5E illustrates the state of the stepping motor 4 at time t5 (see FIG. 8). In this state, the rotor 48 has rotated counterclockwise to a rotation angle substantially equal to 225° and has rotated past the stable point at 180°, and therefore the rotor 48 begins to rotate in the reverse direction. The rotation of the rotor 48 excites a N pole in the side yoke 44 direction and excites S poles in the center yoke 45 and side yoke 46 directions, and the resulting change in magnetic flux and the counter-electromotive force generated thereby creates an induced current in the coil L1. The rotor 48 then proceeds to rotate from this state to the state illustrated in FIG. 5F.

Figure 5F:
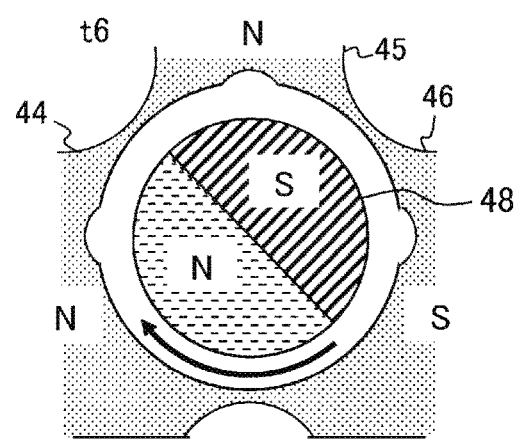

FIG. 5F illustrates the state of the stepping motor 4 at time t6 (see FIG. 8). Here, the rotor 48 has returned to and then rotated past the stable point at 180° once again to a rotation angle substantially equal to 135° in the counterclockwise direction. The rotation of the rotor 48 excites N poles in the side yoke 44 and center yoke 45 directions and excites a S pole in the side yoke 46 direction, and the resulting change in magnetic flux and the counter-electromotive force generated thereby creates an induced current in the coil L1. The rotor 48 then proceeds to rotate from this state to the state illustrated in FIG. 5G.

Figure 5G:
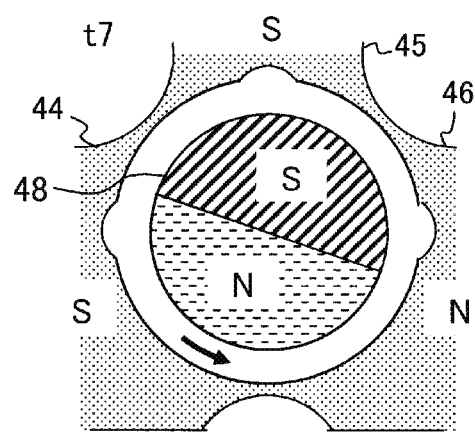

FIG. 5G illustrates the state of the stepping motor 4 at time t7 (see FIG. 8). Here, after having rotated past the stable point, the rotor 48 begins to rotate from the rotation angle substantially equal to 135° back towards the stable point at 180°. The rotation of the rotor 48 excites S poles in the side yoke 44 and center yoke 45 directions and excites a N pole in the side yoke 46 direction, and the resulting change in magnetic flux and the counter-electromotive force generated thereby creates an induced current in the coil L1. The rotor 48 then proceeds to rotate from this state to the state illustrated in FIG. 5H.

Figure 5H:
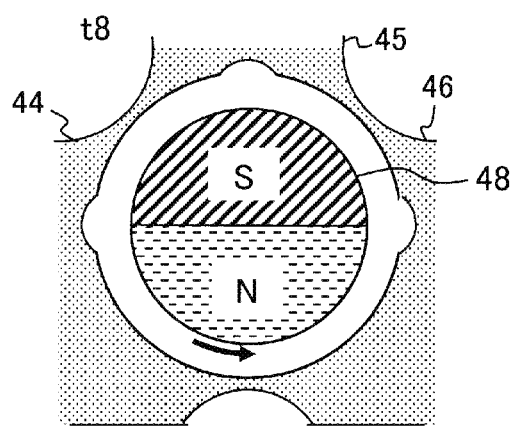

FIG. 5H illustrates the state of the stepping motor 4 at time t8. At time t8, the rotor 48 has stopped at the stable point at 180°. Here, no magnetic poles are excited in any of the side yoke 44, side yoke 46, or center yoke 45 directions, and no induced current is created in the coil L1 due to counter-electromotive force.

As described above, after a drive pulse is applied, the rotor 48 rotates back and forth in the forward direction and the reverse direction around a magnetically stable position. A reverse voltage is induced in the coil L1 while the rotor 48 is rotating in either direction, and in the present embodiment and comparison example, the reverse voltage induced in the coil L1 when the rotor 48 begins to rotate in the opposite direction back towards the magnetically stable point after having rotated past that stable point is detected.

FIGS. 6A to 6H illustrate what happens to the dual-core motor when it fails to properly rotate in a driving scheme of a comparison example.

Figure 6A:
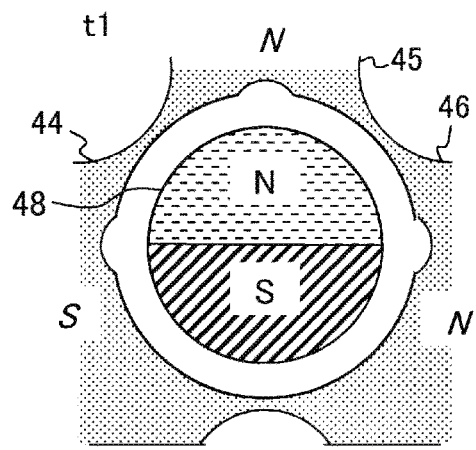
FIGS. 6A to 6H illustrate what happens to the dual-core motor when it fails to properly rotate in a driving scheme of a comparison example.

FIG. 6A illustrates the state of the stepping motor 4 at time t1 (see FIG. 8). In this state, the N pole of the rotor 48 is oriented towards the center yoke 45. At this time, a drive pulse is applied to the coil L1, thereby creating a S pole in the side yoke 44 direction and creating N poles in the center yoke 45 and side yoke 46 directions. The N pole of the rotor 48 is repelled by the N pole in the side yoke 46 direction and attracted to the S pole in the side yoke 44 direction, and therefore the rotor 48 starts to rotate forward to the state illustrated in FIG. 6B.

Figure 6B:
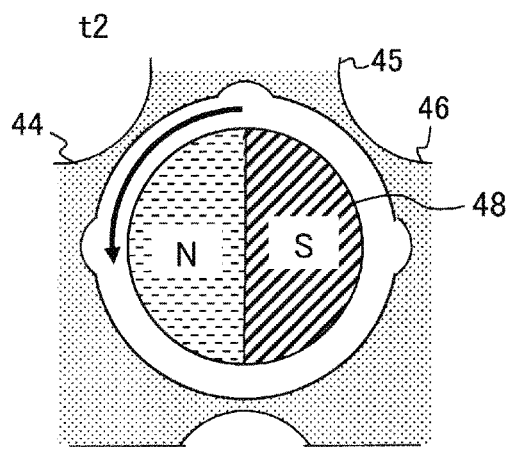

FIG. 6B illustrates the state of the stepping motor 4 at time t2 (see FIG. 8). In this state, the rotor 48 has rotated counterclockwise to a rotation angle substantially equal to 90°. The rotor 48 stops rotating at this position. No magnetic poles are excited in any of the side yoke 44, side yoke 46, or center yoke 45 directions, and no induced current is created in the coil L1 due to counter-electromotive force. The rotor 48 then proceeds to rotate from this state to the state illustrated in FIG. 6C.

Figure 6C:
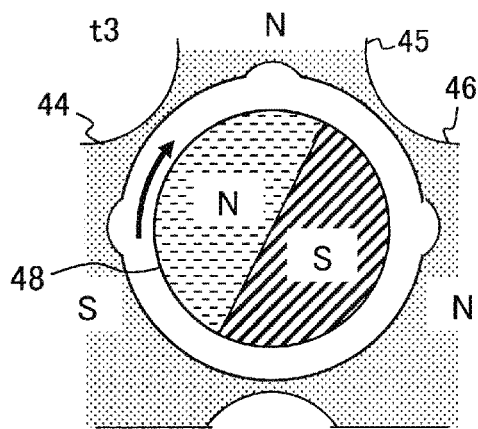

FIG. 6C illustrates the state of the stepping motor 4 at time t3 (see FIG. 8). In this state, the rotor 48 has rotated counterclockwise to a rotation angle substantially equal to 45° and begins to rotate back in the opposite (reverse) direction. That is, we assume here that the rotor fails to rotate properly in response to the drive pulse. In this case, the rotation of the rotor 48 excites a S pole in the side yoke 44 direction and excites N poles in the center yoke 45 and side yoke 46 directions, and the resulting change in magnetic flux and the counter-electromotive force generated thereby creates an induced current in the coil L1. The rotor 48 then proceeds to rotate from this state to the state illustrated in FIG. 6D.

Figure 6D:
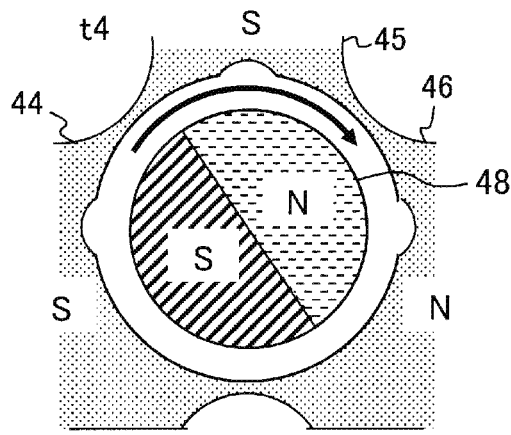

FIG. 6D illustrates the state of the stepping motor 4 at time t4 (see FIG. 8). In this state, the rotor 48 has rotated clockwise to a rotation angle substantially equal to 60° and has rotated past the stable point at 0°. The rotation of the rotor 48 excites S poles in the side yoke 44 and center yoke 45 directions and excites a N pole in the side yoke 46 direction, and the resulting change in magnetic flux and the counter-electromotive force generated thereby creates an induced current in the coil L1. The rotor 48 then proceeds to rotate from this state to the state illustrated in FIG. 6E.

Figure 6E:
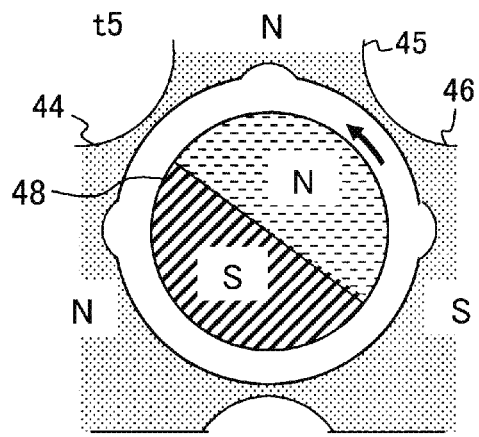

FIG. 6E illustrates the state of the stepping motor 4 at time t5 (see FIG. 8). In this state, the rotor 48 has rotated clockwise to a rotation angle substantially equal to 60° and has rotated past the stable point at 0°, and therefore the rotor 48 begins to rotate in the reverse direction. The rotation of the rotor 48 excites N poles in the side yoke 44 and center yoke 45 directions and excites a S pole in the side yoke 46 direction, and the resulting change in magnetic flux and the counter-electromotive force generated thereby creates an induced current in the coil L1. The rotor 48 then proceeds to rotate from this state to the state illustrated in FIG. 6F.

Figure 6F:
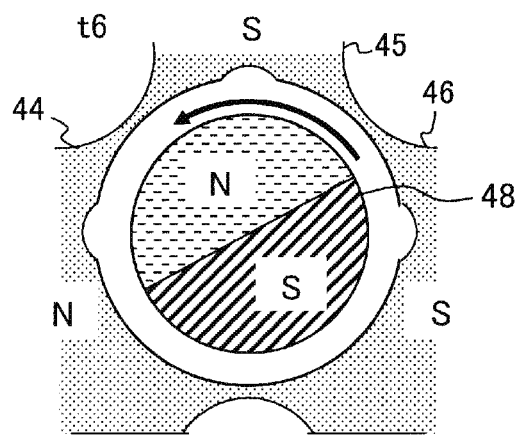

FIG. 6F illustrates the state of the stepping motor 4 at time t6 (see FIG. 8). Here, the rotor 48 has returned to and then rotated past the stable point at 0° once again to a rotation angle substantially equal to 45° in the counterclockwise direction. The rotation of the rotor 48 excites a N pole in the side yoke 44 direction and excites S poles in the center yoke 45 and side yoke 46 directions, and the resulting change in magnetic flux and the counter-electromotive force generated thereby creates an induced current in the coil L1. The rotor 48 then proceeds to rotate from this state to the state illustrated in FIG. 6G.

Figure 6G:
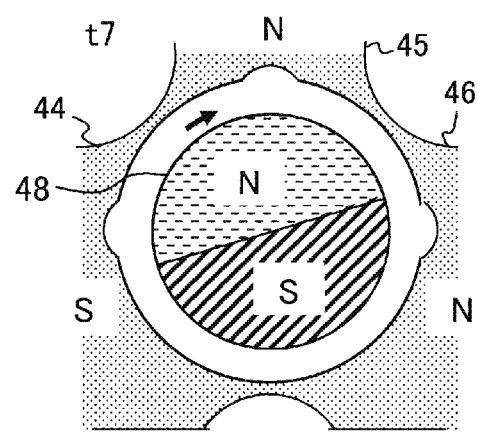

FIG. 6G illustrates the state of the stepping motor 4 at time t7 (see FIG. 8). In this state, the rotor 48 has rotated counterclockwise to a rotation angle substantially equal to 45° and begins to rotate back in the clockwise direction. The rotation of the rotor 48 excites a S pole in the side yoke 44 direction and excites N poles in the center yoke 45 and side yoke 46 directions, and the resulting change in magnetic flux and the counter-electromotive force generated thereby creates an induced current in the coil L1. The rotor 48 then proceeds to rotate from this state to the state illustrated in FIG. 6H.

Figure 6H:
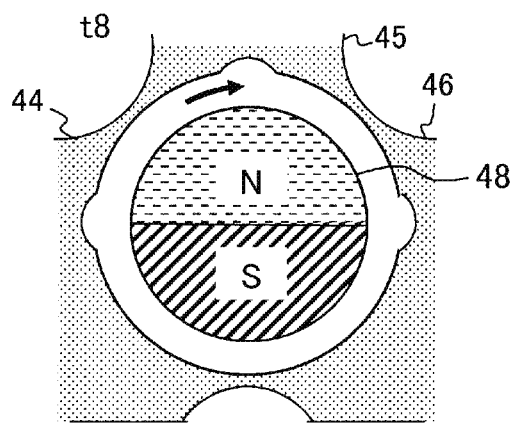

FIG. 6H illustrates the state of the stepping motor 4 at time t8. At time t8, the rotor 48 has stopped at the stable point at 0°. Here, no magnetic poles are excited in any of the side yoke 44, side yoke 46, or center yoke 45 directions, and no induced current is created in the coil L1 due to counter-electromotive force.

As described above, after a drive pulse is applied, even if the rotor 48 cannot reach the magnetically stable position at 180°, the rotor 48 rotates back and forth in the forward direction and the reverse direction around the magnetically stable position at 0°. In the comparison example, the rotor 48 does not reach the magnetically stable position at 180°, and the reverse voltage induced in the coil L1 when the rotor 48 rotates back towards the initial position of 0° is detected. Whether the rotor 48 has rotated is therefore detected according to whether this reverse voltage is greater than a threshold value (after first reversing the sign of the reverse voltage). The problem in this comparison example is that the the induced current due to the counter-electromotive force that is detected in FIGS. 6E and 6F (i.e., when the rotation is not happening) could be as large as that in FIGS. 5E and 5F (i.e., when the rotation is successfully occurring). Thus, as discussed above, it is difficult to distinguish the successful rotation from the failed rotation by monitoring the amount of such an induced current generated due to this counter-electromotive force.

FIGS. 7A to 7H illustrate what happens to the dual-core motor when it is not rotating properly in response to a drive pulse when a control scheme according to an embodiment of the present embodiment is employed.

Figure 7A:
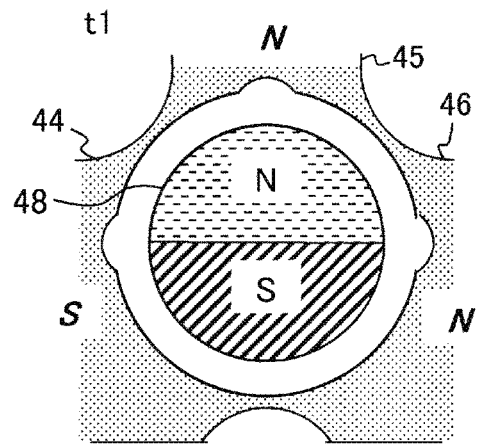
FIGS. 7A to 7H illustrate a sequence in which a counter-pulse is applied while a dual-core motor is not rotating as part of a control scheme according to the present embodiment.
Figure 7B:
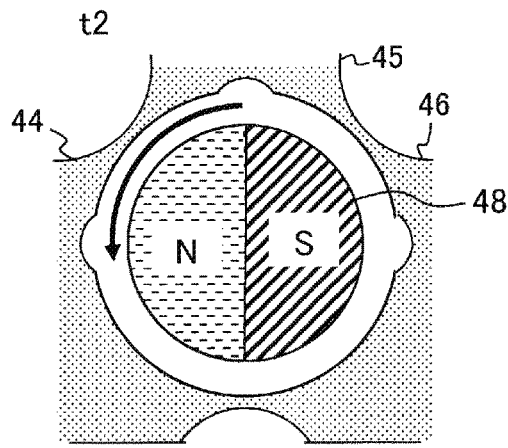

FIG. 7A illustrates the same state as FIG. 6A, and FIG. 7B illustrates the same state as FIG. 6B.

Figure 7C:
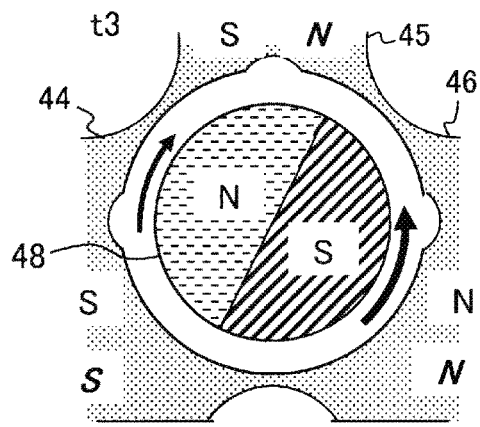

FIG. 7C illustrates the state of the stepping motor 4 at time t3 (see FIG. 8). In this state, the rotor 48 has rotated counterclockwise to a rotation angle substantially equal to 45° and begins to rotate back in the opposite (reverse) direction, thereby exciting S poles in the side yoke 44 and center yoke 45 directions and exciting an N pole in the side yoke 46 direction. At this time, in this control scheme embodiment, an additional counter pulse (to reduce a counter-rotation when the rotation is not occurring) is applied to the coil L1, thereby creating a S pole in the side yoke 44 direction and creating N poles in the center yoke 45 and side yoke 46 directions. The resulting magnetic flux acts as a braking force that counteracts the rotation of the rotor 48 due to the failure to properly rotate, thereby reducing the magnitude of the current subsequently induced due to counter-electromotive force. This additional counter pulse does not adversely affect a proper detection of rotation when the rotation properly occurs because the additional pulse is applied to the coil L1 when the rotor 48 is in the state illustrated in FIG. 5C, thereby creating a S pole in the side yoke 44 direction and creating N poles in the center yoke 45 and side yoke 46 directions. Thus, no braking force is applied counteracting the rotation of the rotor 48, and therefore the magnitude of the current subsequently induced due to counter-electromotive force shown in FIGS. 5E and 5F is not reduced.

Figure 7D:
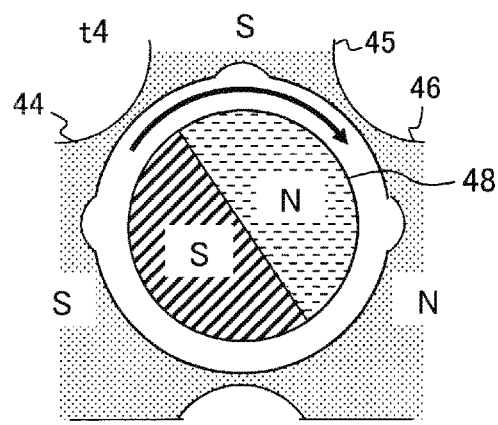

The rotor 48 then proceeds to rotate from this state to the state illustrated in FIG. 7D.

FIG. 7D illustrates the state of the stepping motor 4 at time t4 (see FIG. 8). In this state, the rotor 48 has rotated clockwise to a rotation angle substantially equal to 60° and has rotated past the stable point at 0°. The rotation of the rotor 48 excites S poles in the side yoke 44 and center yoke 45 directions and excites a N pole in the side yoke 46 direction, and the resulting change in magnetic flux and the counter-electromotive force generated thereby creates an induced current in the coil L1. The rotor 48 then proceeds to rotate from this state to the state illustrated in FIG. 7E.

Figure 7E:
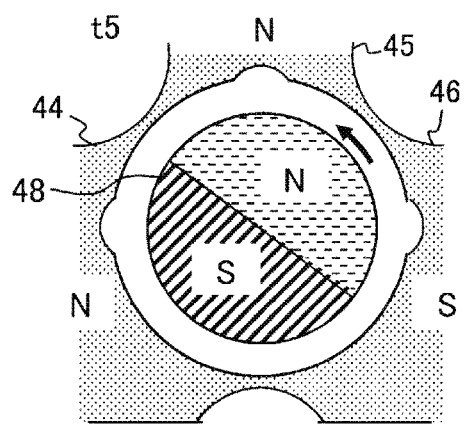

FIG. 7E illustrates the state of the stepping motor 4 at time t5 (see FIG. 8). In this state, the rotor 48 has rotated clockwise to a rotation angle substantially equal to 60° and has rotated past the stable point at 0°, and therefore the rotor 48 begins to rotate in the reverse direction. The rotation of the rotor 48 excites N poles in the side yoke 44 and center yoke 45 directions and excites a S pole in the side yoke 46 direction, and the resulting change in magnetic flux and the counter-electromotive force generated thereby creates an induced current in the coil L1. The magnitude of the current induced due to counter-electromotive force at this time is less than the magnitude of the current induced due to counter-electromotive force in the state illustrated in FIG. 6E. The rotor 48 then proceeds to rotate from this state to the state illustrated in FIG. 7F.

Figure 7F:
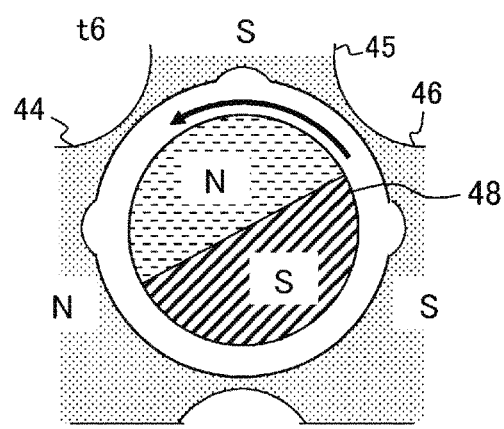

FIG. 7F illustrates the state of the stepping motor 4 at time t6 (see FIG. 8). Here, the rotor 48 has returned to and then rotated past the stable point at 0° once again to a rotation angle substantially equal to 45° in the counterclockwise direction. The rotation of the rotor 48 excites a N pole in the side yoke 44 direction and excites S poles in the center yoke 45 and side yoke 46 directions, and the resulting change in magnetic flux and the counter-electromotive force generated thereby creates an induced current in the coil L1. The magnitude of the current induced due to counter-electromotive force at this time is less than the magnitude of the current induced due to counter-electromotive force in the state illustrated in FIG. 6F. The rotor 48 then proceeds to rotate from this state to the state illustrated in FIG. 7G.

Figure 7G:
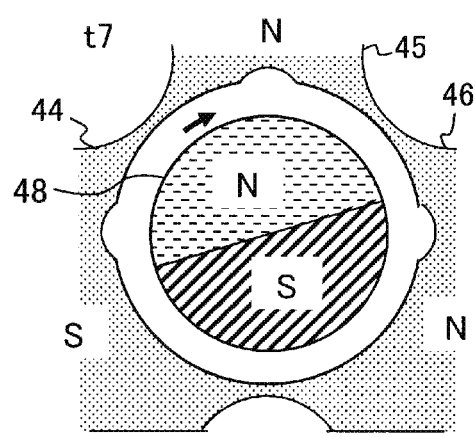

FIG. 7G illustrates the state of the stepping motor 4 at time t7 (see FIG. 8). In this state, the rotor 48 has rotated counterclockwise to a rotation angle substantially equal to 45° and begins to rotate back in the clockwise direction. The rotation of the rotor 48 excites a S pole in the side yoke 44 direction and excites N poles in the center yoke 45 and side yoke 46 directions, and the resulting change in magnetic flux and the counter-electromotive force generated thereby creates an induced current in the coil L1. The magnitude of the current induced due to counter-electromotive force at this time is less than the magnitude of the current induced due to counter-electromotive force in the state illustrated in FIG. 6G. The rotor 48 then proceeds to rotate from this state to the state illustrated in FIG. 7H.

Figure 7H:
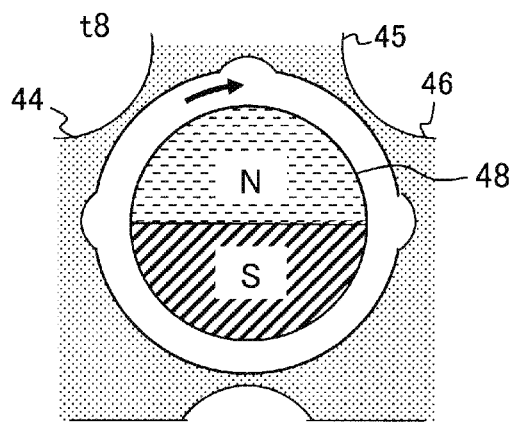

FIG. 7H illustrates the state of the stepping motor 4 at time t8. At time t8, the rotor 48 has stopped at the stable point at 0°. Here, no magnetic poles are excited in any of the side yoke 44, side yoke 46, or center yoke 45 directions, and no induced current is created in the coil L1 due to counter-electromotive force.

As described above, after a drive pulse is applied, even if the rotor 48 cannot reach the magnetically stable position at 180°, the rotor 48 rotates back and forth in the forward direction and the reverse direction around the magnetically stable position at 0°. In the present embodiment, the rotor 48 does not reach the magnetically stable position at 180°, a braking force is applied to the rotor 48 as it rotates back towards the initial position at 0°, and the reverse voltage subsequently induced in the coil L1 is detected.

<Comparison Example>

FIG. 8 is a waveform diagram for the driver circuit 5 when used in a control scheme according to a comparison example.

The waveform diagram shows the voltage waveform at the connection point O1, the voltage waveform at the connection point O2, and the motor current waveform against the same time axis. Labels for several periods in the waveforms are included above the waveform diagram.

The "drive pulse period" refers to the period of time during which a drive pulse is applied to the connection point O2. The time t1 corresponds to when the drive pulse begins to be applied, and the time t2 corresponds to a time that is substantially halfway through the drive pulse period. During the drive pulse period, a current of a prescribed magnitude flows through the motor.

The MASK period refers to a period of time during which detection is masked at the connection point O2. The time t3 corresponds to the end of the MASK period.

The O2 detection period refers to a period of time during which the current flowing through the connection point O2 is detected. The O2 detection period begins immediately after the time t3. The motor current flows in a forward direction at times t3 and t4, in a reverse direction at times t5 and t6, and in the forward direction again at time t7. Near times t5 and t6, voltage pulses are created at the connection point O2 due to the detection taking place. Next, the operation of the driver circuit 5 during each of these periods will be described in detail with reference to FIG. 9.

FIGS. 9A to 9D illustrate the operation of the driver circuit 5 when used in the control scheme according to the comparison example.

Figure 9A:
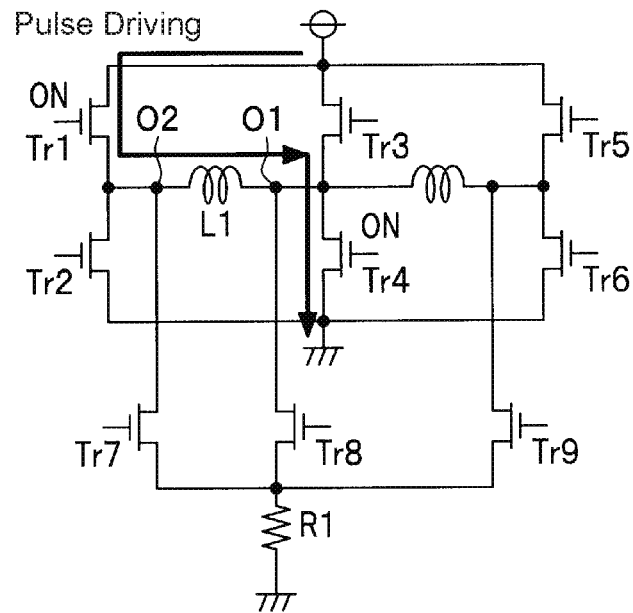
FIGS. 9A to 9D illustrate the operation of the driver circuit used in the control scheme according to the comparison example.

The arrow in FIG. 9A illustrates the current path when a drive pulse is applied to the coil L1.

First, the drive pulse generation circuit 692 (see FIG. 2) switches ON the switching elements Tr1 and Tr4 and switches OFF all of the other switching elements. At this time, a motor current of a prescribed magnitude flows from the power supply through the switching element Tr1, the coil L1, and the switching element Tr4. Here, the current flowing from the connection point O2 to the connection point O1 is defined to be flowing in the forward direction. Note that in FIG. 9A, the switching elements that are switched ON are labeled with "ON", and the switching elements that are switched OFF are labeled with "OFF" or are not labeled.

Figure 9B:
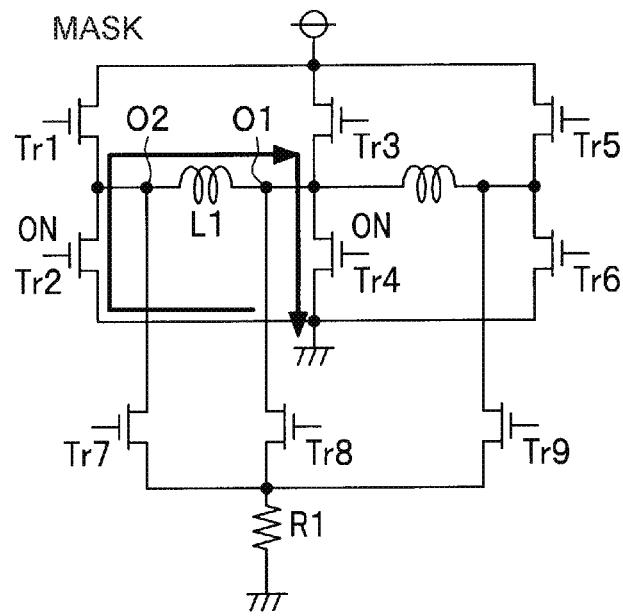

The arrow in FIG. 9B illustrates the current path during the MASK period.

At the beginning of the MASK period, the switching elements Tr1 and Tr4 are still in the ON state. The motor controller 69 (see FIG. 2) switches OFF the switching element Tr1 and switches ON the switching element Tr2. Therefore, the switching elements Tr2 and Tr4 are in the ON state, and all of the other switching elements are in the OFF state. When the rotor 48 (see FIG. 3) rotates in the forward direction, a current is induced in the coil L1 due to the resulting counter-electromotive force. This current flows from the connection point O2 towards the connection point O1 and circulates through the switching elements Tr4 and Tr2. Then, the rotor 48 (see FIG. 3) begins to rotate in the opposite direction, resulting in the state illustrated in FIG. 9C.

Figure 9C:
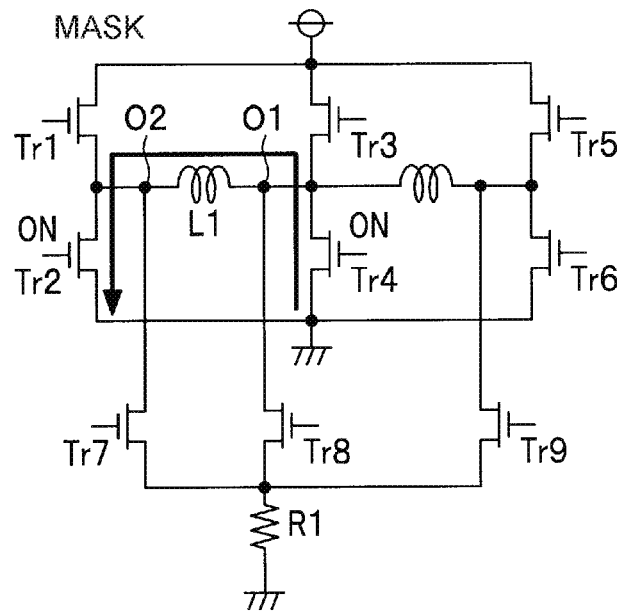

The arrow in FIG. 9C illustrates the current path during the MASK period.

Here, the switching elements Tr2 and Tr4 are in the ON state, and all of the other switching elements are in the OFF state. When the rotor 48 (see FIG. 3) rotates in the reverse direction, a current is induced in the coil L1 due to the resulting counter-electromotive force. This current flows from the connection point O1 towards the connection point O2 and circulates through the switching elements Tr2 and Tr4.

Figure 9D:
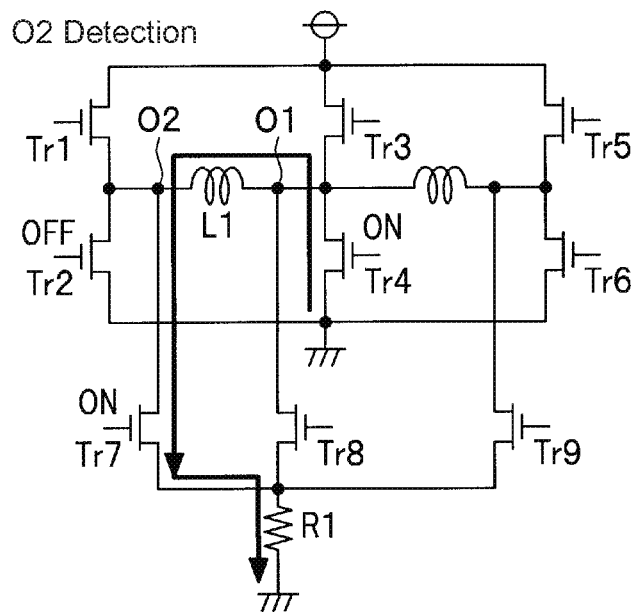

FIG. 9D illustrates the current path when the current is detected during the O2 detection period.

At the beginning of the O2 detection period, the switching elements Tr2 and Tr4 are still in the ON state. The counter pulse generation circuit 693 (see FIG. 2) switches ON the switching element Tr7 and then begins to switch OFF the switching element Tr2 at appropriately short intervals. All of the other switching elements are switched OFF. FIG. 9D illustrates a state in which the switching element Tr7 is in the ON state and the switching element Tr2 is in the OFF state.

When the rotor 48 (see FIG. 3) rotates in the reverse direction, a current is induced in the coil L1 due to the resulting counter-electromotive force. This current flows from the connection point O1 towards the connection point O2 and circulates through the switching element Tr7, the resistor R1, the ground, and the switching element Tr4. The A/D converter 695 (see FIG. 2) measures the terminal voltage of the resistor R1, thereby making it possible to measure the counter-electromotive force.

<Present Embodiment>

In the present embodiment, a counter-electromotive force reduction pulse (or simply a counter pulse) is applied relatively very soon after the drive pulse for rotating the indicator hands, thereby reducing the rotation of the rotor and making it possible to reduce the magnitude of the counter-electromotive force generated when the rotor is not rotating. Moreover, the pulse width, duty cycle, and timing of the counter-electromotive force reduction pulse can be adjusted as necessary to make it possible to appropriately handle changes in the motor state or the like.

FIGS. 10A to 10D illustrate several types of counter-electromotive force reduction pulses used in the present embodiment. Each diagram shows the voltage at the connection point O2.

Figure 10A:
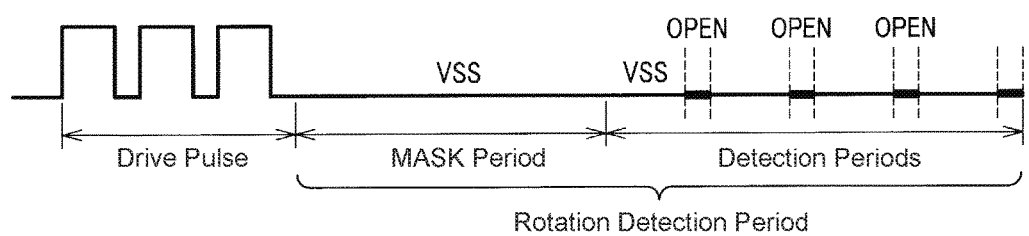
FIGS. 10A to 10D illustrate several types of counter-electromotive force reduction pulses used in the embodiment of the present invention.

FIG. 10A shows the voltage waveform at the connection point O2 for a case in which no counter-electromotive force reduction pulse is applied.

First, a drive pulse is applied to the connection point O2. Here, the drive pulse includes three individual pulses. Next, during the MASK period, the motor controller 69 (see FIG. 2) switches ON the switching element Tr2, thereby connecting the connection point O2 to the ground. As a result, the voltage at the connection point O2 becomes equal to a voltage Vss.

During the detection period, after the switching elements Tr2, Tr4, and Tr7 (see FIG. 4) are switched ON, the counter pulse generation circuit 693 (see FIG. 2) switches OFF the switching element Tr2 at appropriately short intervals. In FIG. 10A, the periods during which the switching element Tr2 is in the OFF state are labeled with "OPEN". If a prescribed voltage is detected across the resistor R1 (see FIG. 9D) during these OPEN periods, it is determined that the stepping motor 4 (see FIG. 3) rotated correctly.

Moreover, together the MASK period and the detection period constitute a rotation detection period for detecting the rotation of the stepping motor 4.

Figure 10B:
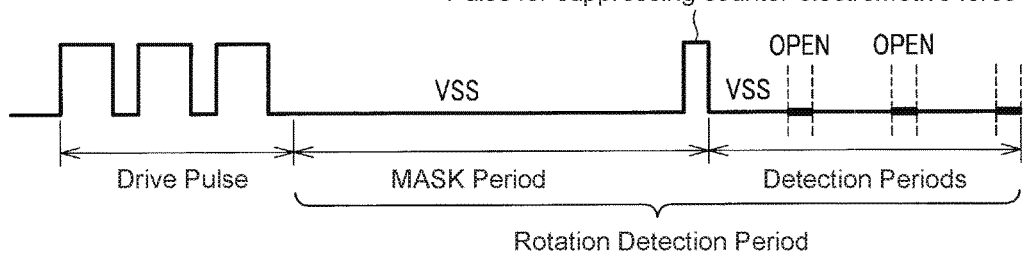

FIG. 10B shows the voltage waveform at the connection point O2 for a case in which a single counter-electromotive force reduction pulse is applied.

The drive pulse is the same as in FIG. 10A. Next, during the MASK period, the motor controller 69 switches ON the switching element Tr2, thereby connecting the connection point O2 to the ground. As a result, the voltage at the connection point O2 becomes equal to the voltage Vss. Before the MASK period ends, a single counter-electromotive force reduction pulse is applied. This makes it possible to apply a braking force that will counteract subsequent rotation of the rotor 48 when the rotor 48 is not rotating.

Then, during the detection period, after the switching elements Tr2, Tr4, and Tr7 (see FIG. 4) are switched ON, the switching element Tr2 is switched OFF at appropriately short intervals corresponding to the OPEN periods. If a prescribed voltage is detected during these OPEN periods, it is determined that the stepping motor 4 (see FIG. 3) rotated correctly.

Figure 10C:
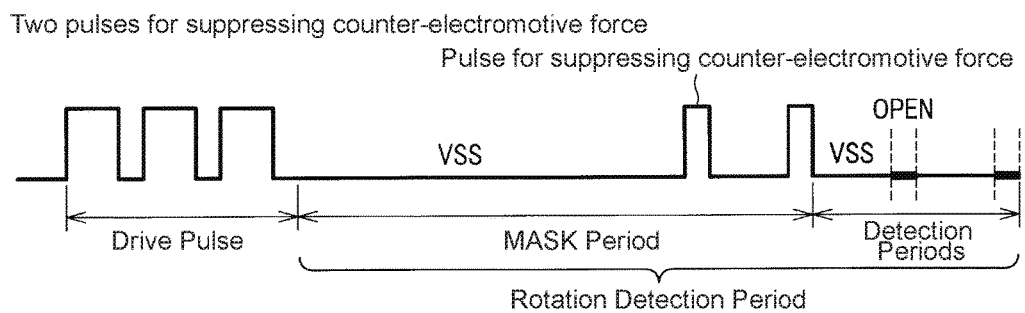
Figure 10D:
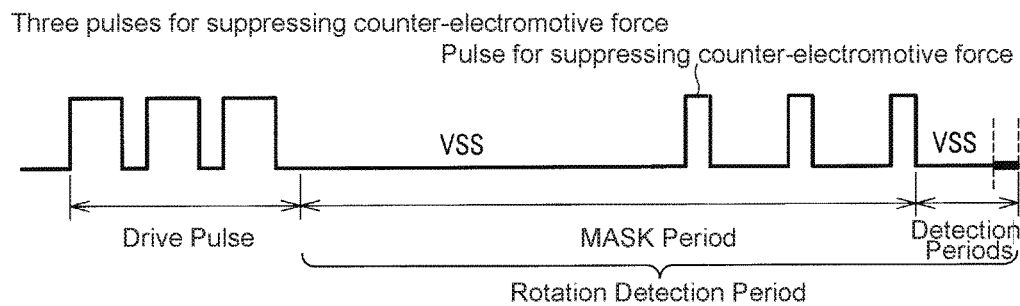

FIG. 10C shows the voltage waveform at the connection point O2 for a case in which two counter-electromotive force reduction pulses are applied. FIG. 10D shows the voltage waveform at the connection point O2 for a case in which three counter-electromotive force reduction pulses are applied. These two cases are the same as the case depicted in FIG. 10B except in that the number of counter-electromotive force reduction pulses is changed in order to apply a stronger braking force.

Figure 11:
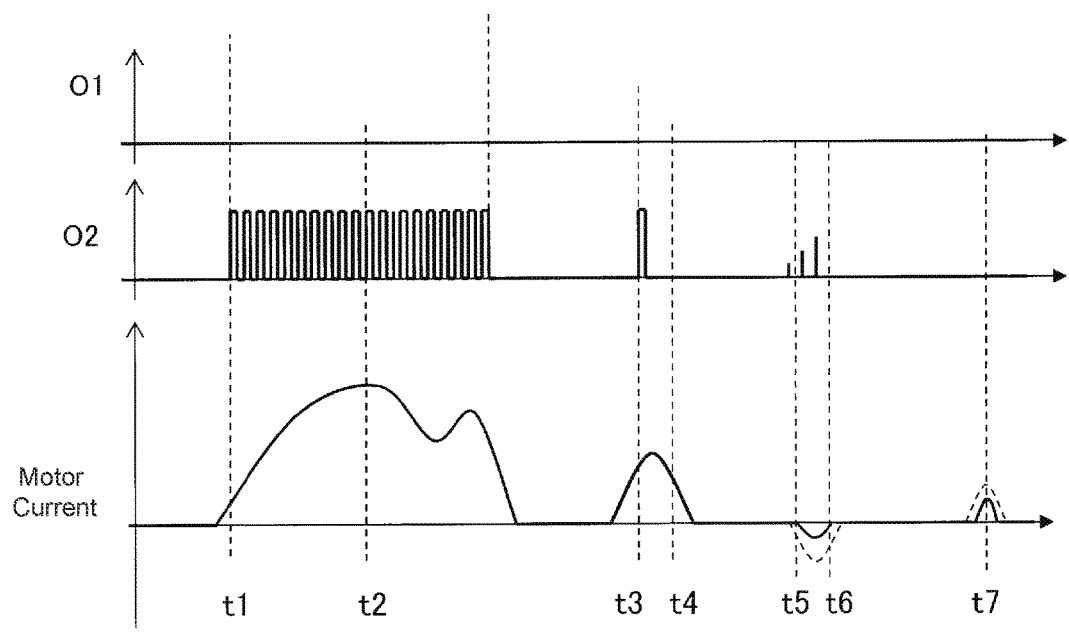
FIG. 11 is a waveform diagram for a driver circuit used in a control scheme according to the embodiment of the present invention.

FIG. 11 is a waveform diagram for the driver circuit 5 when used in a control scheme according to the present embodiment.

Like FIG. 8, this waveform diagram shows the voltage waveform at the connection point O1, the voltage waveform at the connection point O2, and the motor current waveform against the same time axis when the driving scheme of the present embodiment, including the counter-electromotive force reduction pulse, is applied. Here, the solid line represents the waveform when the rotor failed to rotate, corresponding to the case as illustrated in FIGS. 7A to 7H. The dashed line represents the waveform corresponding to the case illustrated in FIGS. 5A to 5H—i.e., when the rotor successfully rotated.

The drive pulse is applied to the connection point O2 starting at time t1, and the time t2 corresponds to a time that is substantially halfway through the drive pulse period.

After the drive pulse is complete and a prescribed period of time has elapsed, a current induced due to the resulting counter-electromotive force begins to flow through the connection point O2. Then, at time t3, the counter-electromotive force reduction pulse is applied to the connection point O2. This counter-electromotive force reduction pulse applies a braking force to the rotor 48 when the rotor 48 is not rotating.

Next, at approximately time t5, the motor current starts flowing in the reverse direction, and rotation detection pulses appear at the connection point O2. These rotation detection pulses appear when the current flowing through the coil L1 is measured. As illustrated by the solid line in FIG. 11, at this time the magnitude of the induced current is sufficiently reduced, thereby indicating that the rotor 48 failed to rotate, because the counter-electromotive force reduction pulse was applied at time t3 to apply a braking force to the rotor 48. In contrast, as illustrated by the dashed line, when the rotor 48 successfully rotated, a current of a sufficiently large magnitude will be produced even if a counter-electromotive force reduction pulse was applied. Therefore, applying the counter-electromotive force reduction pulse makes it possible to clearly determine whether the rotor 48 rotated.

Moreover, if the rotor 48 has not rotated, applying drive pulses to both of the coils L1 and L2, for example, makes it possible to reliably rotate the rotor 48.

FIGS. 12A to 12E illustrate the operation of the driver circuit 5 when used in the control scheme according to the present embodiment.

Figure 12A:
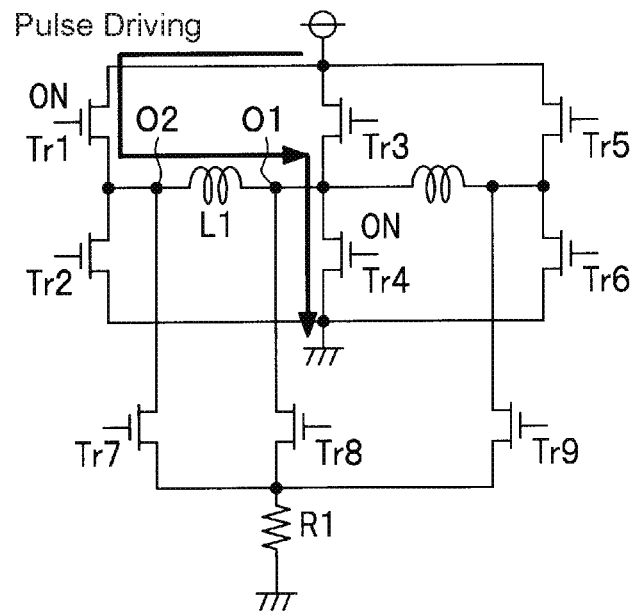
FIGS. 12A to 12E illustrate the operation of the driver circuit used in the control scheme according to the embodiment of the present invention.

Like in the case in the comparison example illustrated in FIG. 9A, the arrow in FIG. 12A illustrates the current path when a drive pulse is applied to the coil L1.

First, the drive pulse generation circuit 692 (see FIG. 2) switches ON the switching elements Tr1 and Tr4 and switches OFF all of the other switching elements. At this time, a motor current of a prescribed magnitude flows in the forward direction from the power supply through the switching element Tr1, the coil L1, and the switching element Tr4.

Figure 12B:
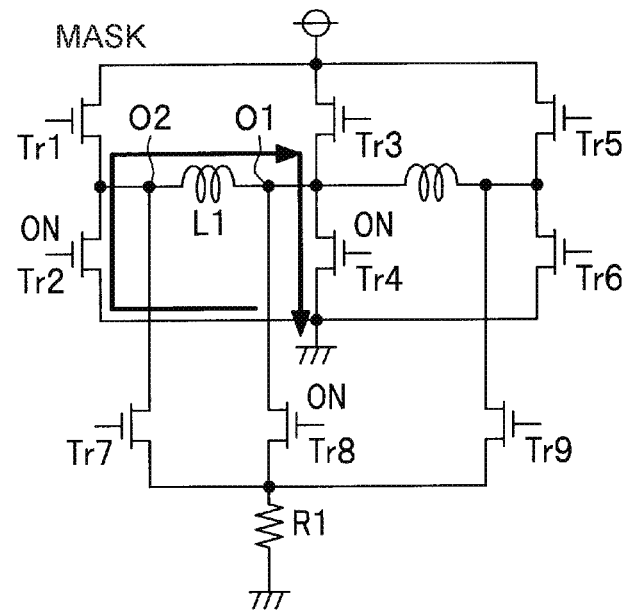

Like in the case in the comparison example illustrated in FIG. 9B, the arrow in FIG. 12B illustrates the current path during the MASK period.

At the beginning of the MASK period, the switching elements Tr1 and Tr4 are still in the ON state. The motor controller 69 (see FIG. 2) switches OFF the switching element Tr1 and switches ON the switching element Tr2. Therefore, the switching elements Tr2 and Tr4 are in the ON state, and all of the other switching elements are in the OFF state. When the rotor 48 (see FIG. 3) rotates in the forward direction, a current is induced in the coil L1 due to the resulting counter-electromotive force. This current flows from the connection point O2 towards the connection point O1 and circulates through the switching elements Tr4 and Tr2. From this state, a counter-electromotive force reduction pulse is applied as illustrated in FIG. 12C.

Figure 12C:
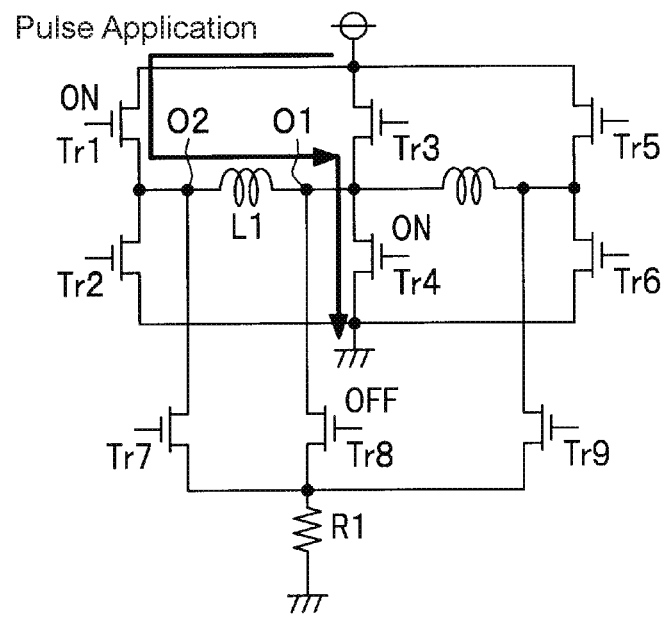

The arrow in FIG. 12C illustrates the current path when a counter-electromotive force reduction pulse is applied to the coil L1.

Initially, the switching elements Tr2 and Tr4 are still in the ON state. Therefore, the counter pulse generation circuit 693 (see FIG. 2) switches OFF the switching element Tr2 and then begins to switch ON the switching element Tr1 at appropriately short intervals. All of the other switching elements are switched OFF. At this time, a current flows in the forward direction from the power supply through the switching element Tr1, the coil L1, and the switching element Tr4. This current corresponds to the counter-electromotive force reduction pulse that applies a braking force to the rotor 48 (see FIG. 3) when the rotor 48 is not rotating.

Figure 12D:
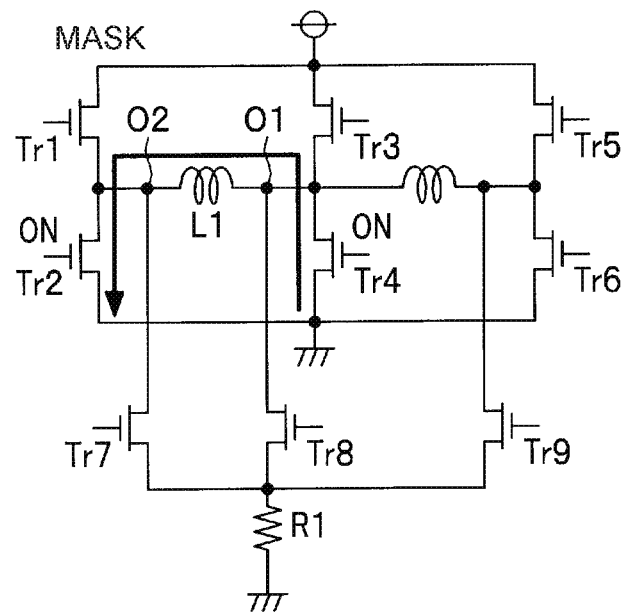

Like in the case in the comparison example illustrated in FIG. 9C, the arrow in FIG. 12D illustrates the current path during the MASK period.

At the beginning of the MASK period, the switching element Tr4 is still in the ON state. The motor controller 69 (see FIG. 2) switches ON the switching element Tr2. Therefore, the switching elements Tr2 and Tr4 are in the ON state, and all of the other switching elements are in the OFF state.

When the rotor 48 (see FIG. 3) rotates in the reverse direction, a current is induced in the coil L1 due to the resulting counter-electromotive force. This current flows from the connection point O1 towards the connection point O2 and circulates through the switching elements Tr2 and Tr4.

Figure 12E:
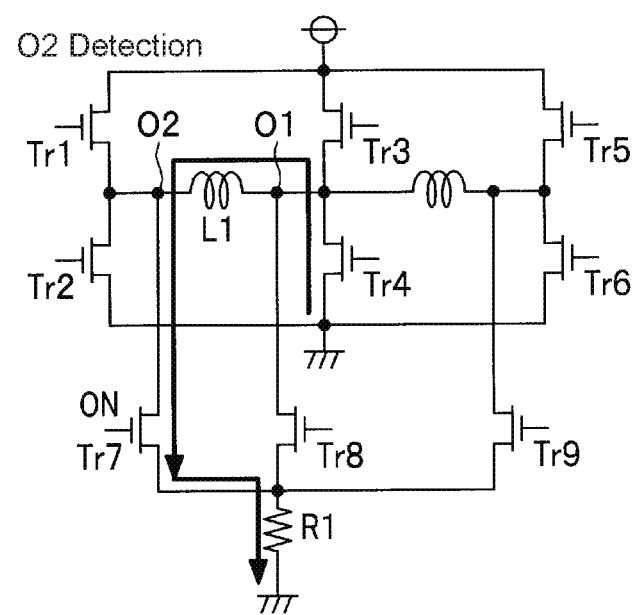

FIG. 12E illustrates the current path when the current is detected during the 02 detection period.

At the beginning of the O2 detection period, the switching elements Tr2 and Tr4 are still in the ON state. The counter pulse generation circuit 693 (see FIG. 2) switches ON the switching element Tr7 and then begins to switch OFF the switching element Tr2 at appropriately short intervals. All of the other switching elements are switched OFF. FIG. 12E illustrates a state in which the switching element Tr7 is in the ON state and the switching element Tr2 is in the OFF state.

When the rotor 48 (see FIG. 3) rotates in the reverse direction, a current is induced in the coil L1 due to the resulting counter-electromotive force. This current flows from the connection point O1 towards the connection point O2 and circulates through the switching element Tr7, the resistor R1, the ground, and the switching element Tr4. The A/D converter 695 (see FIG. 2) measures the terminal voltage of the resistor R1, thereby making it possible to measure the counter-electromotive force.

In the present embodiment, after applying the initial drive pulse, applying a short pulse while the rotor 48 is not rotating in order to create a braking force that counteracts the subsequent rotation of the rotor 48 reduces the speed of that subsequent rotation as well as the magnitude of the resulting counter-electromotive force. In this way, the counter-electromotive force when the rotor 48 is not rotating is less than the counter-electromotive force when the rotor 48 is rotating, thereby making it possible to prevent rotation misdetections while the rotor 48 is not actually rotating.

The present embodiment also makes it possible to prevent rotation misdetections when the rotor 48 is not actually rotating even in situations with non-negligible sample variation or high temperatures, for example. This makes it possible to detect rotation regardless of the external conditions as well as to achieve low consumption during normal operation of the indicator hands.

<Modification Example>

In a modification example, a counter-electromotive force reduction pulse is applied to the coil L1 when a forward current is detected. This makes it possible to apply the braking force to the rotor 48 more accurately than when simply applying the counter-electromotive force reduction pulse after a prescribed period of time.

Figure 13:
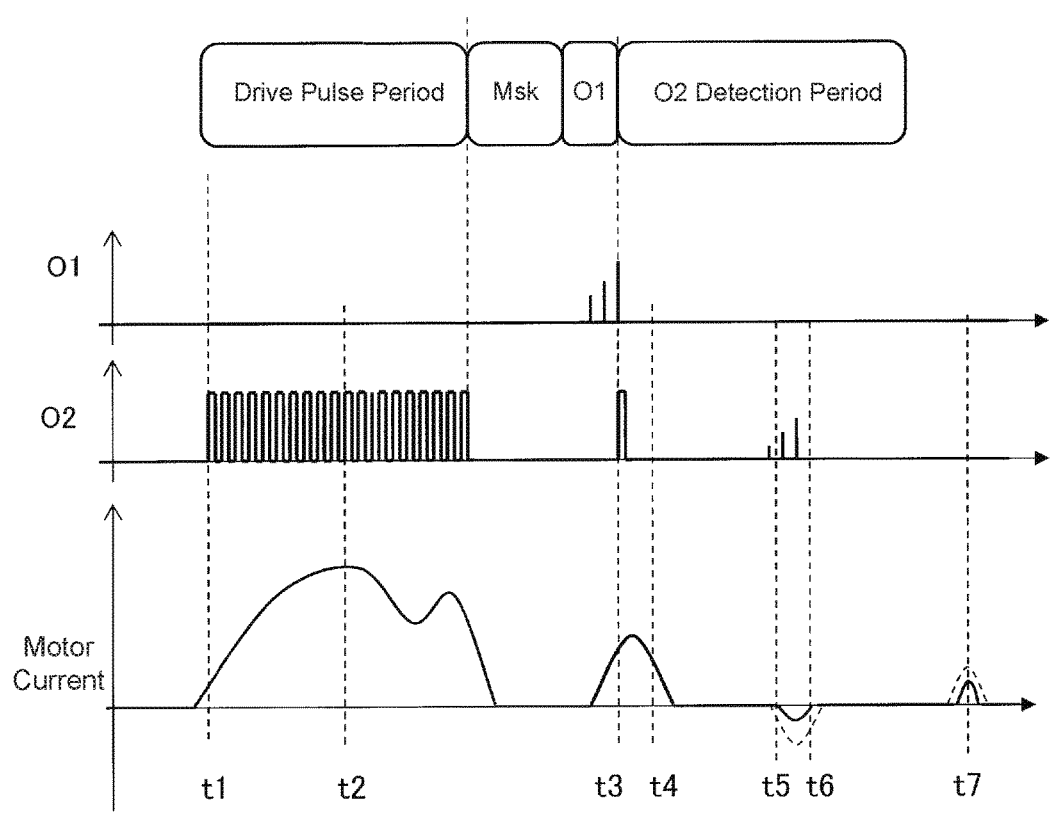
FIG. 13 is a waveform diagram for a driver circuit used in a control scheme according to a modification example.

FIG. 13 is a waveform diagram for the driver circuit 5 when used in a control scheme according to the modification example.

Like FIG. 8, this waveform diagram shows the voltage waveform at the connection point O1, the voltage waveform at the connection point O2, and the motor current waveform against the same time axis and with each time period labeled appropriately. Here, the solid line represents the waveform corresponding to the case in which a counter-electromotive force reduction pulse is applied when the rotor is not rotating, as illustrated in FIGS. 7A to 7H. The dashed line represents the waveform corresponding to the case illustrated in FIGS. 5A to 5H.

The drive pulse is applied to the connection point O2 starting at time t1, and the time t2 corresponds to a time that is substantially halfway through the drive pulse period.

After the drive pulse is complete, a mask period of a prescribed duration begins. In FIG. 13, this period is labeled with "Msk".

Then, during an O1 detection period (labeled as "O1" in the figure), the motor current begins to flow due to counter-electromotive force, and rotation detection pulses appear at the connection point O1. At time t3, when the rotation detection pulses have reached a prescribed value, a counter-electromotive force reduction pulse is applied to the connection point O2. This counter-electromotive force reduction pulse applies a braking force to the rotor 48 when the rotor 48 is not rotating.

Next, in an O2 detection period, at approximately time t5 the motor current starts flowing in the reverse direction, and rotation detection pulses appear at the connection point O2. These rotation detection pulses appear when the current flowing through the coil L1 is measured. As illustrated by the solid line in FIG. 13, at this time the magnitude of the current is reduced because the rotor 48 failed to rotate and because the counter-electromotive force reduction pulse was applied at time t3 to apply a braking force to the rotor 48. In contrast, as illustrated by the dashed line, if the rotor 48 is still rotating, a current of a sufficiently large magnitude will be produced even if a counter-electromotive force reduction pulse was applied. Therefore, applying the counter-electromotive force reduction pulse makes it possible to clearly determine whether the rotor 48 rotated.

FIG. 14 illustrates the operation of the driver circuit 5 when used in a control scheme according to the modification example.

Figure 14A:
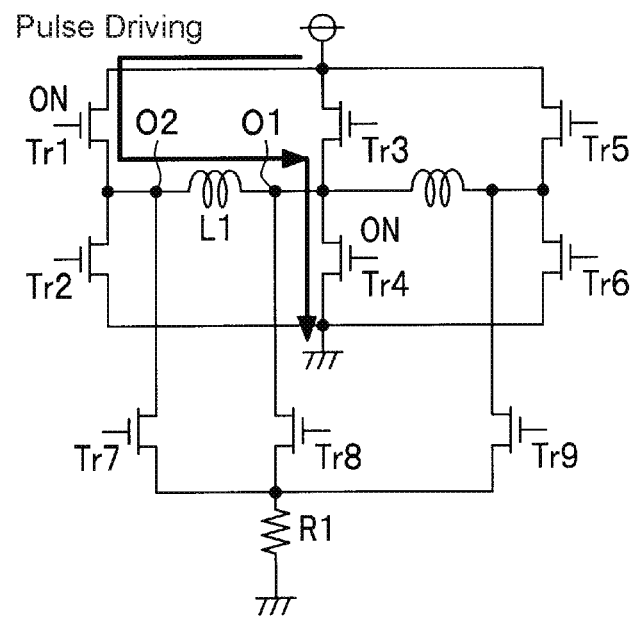
FIGS. 14A to 14F illustrate the operation of the driver circuit used in the control scheme according to the modification example.

Like in the case in the comparison example illustrated in FIG. 9A, the arrow in FIG. 14A illustrates the current path when a drive pulse is applied to the coil L1.

First, the drive pulse generation circuit 692 (see FIG. 2) switches ON the switching elements Tr1 and Tr4 and switches OFF all of the other switching elements. At this time, a motor current of a prescribed magnitude flows in the forward direction from the power supply through the switching element Tr1, the coil L1, and the switching element Tr4.

Figure 14B:
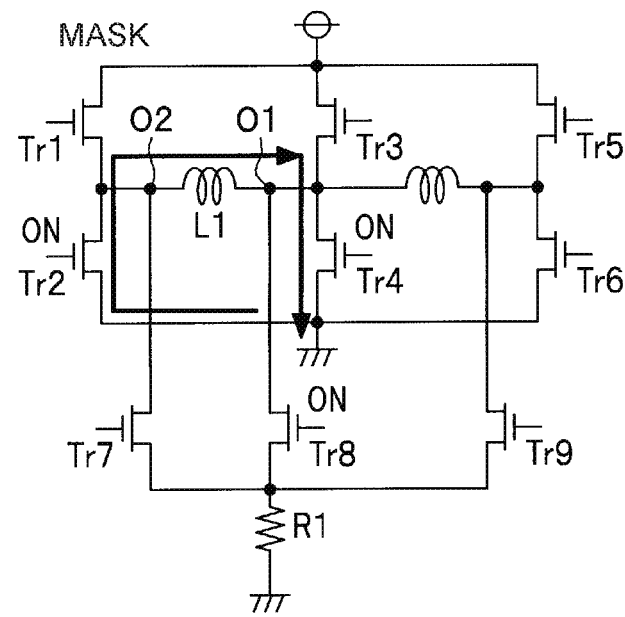

Like in the case in the comparison example illustrated in FIG. 9B, the arrow in FIG. 14B illustrates the current path during the MASK period.

At the beginning of the MASK period, the switching elements Tr1 and Tr4 are still in the ON state. The motor controller 69 (see FIG. 2) switches OFF the switching element Tr1 and switches ON the switching element Tr2. Therefore, the switching elements Tr2 and Tr4 are in the ON state, and all of the other switching elements are in the OFF state. When the rotor 48 (see FIG. 3) rotates in the forward direction, a current is induced in the coil L1 due to the resulting counter-electromotive force. This current flows from the connection point O2 towards the connection point O1 and circulates through the switching elements Tr4 and Tr2.

Figure 14C:
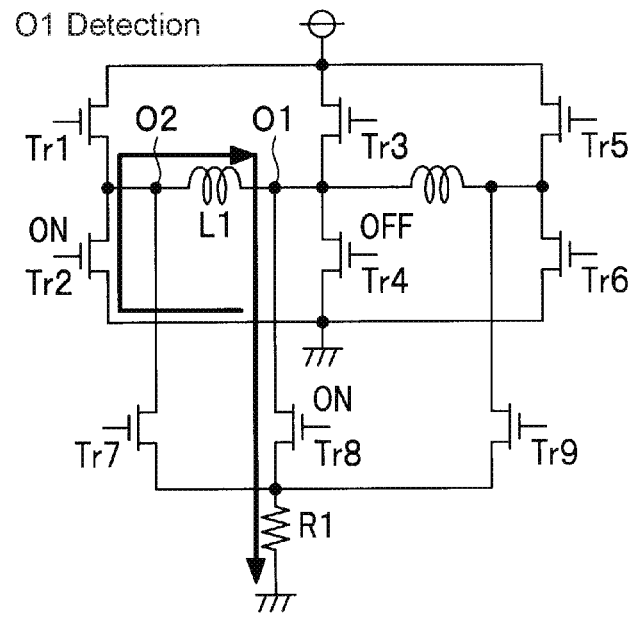

FIG. 14C illustrates the current path when the current is detected during the 01 detection period.

At the beginning of the 01 detection period, the switching elements Tr2 and Tr4 are still in the ON state. The counter pulse generation circuit 693 (see FIG. 2) switches ON the switching element Tr8 and then begins to switch OFF the switching element Tr4 at appropriately short intervals. All of the other switching elements are switched OFF. FIG. 14C illustrates a state in which the switching element Tr8 is in the ON state and the switching element Tr4 is in the OFF state.

When the rotor 48 (see FIG. 3) rotates in the forward direction, a current is induced in the coil L1 due to the resulting counter-electromotive force. This current flows from the connection point O2 towards the connection point O1 and circulates through the switching element Tr7, the resistor R1, the ground, and the switching element Tr4. In the modification example, the A/D converter 695 (see FIG. 2) measures the terminal voltage of the resistor R1, thereby making it possible to measure the counter-electromotive force. If the load of the stepping motor 4 fluctuates, the timing at which the counter-electromotive force reduction pulse should be applied to the coil L1 may potentially change. In the modification example, the counter-electromotive force is measured while determining the timing at which to apply the counter-electromotive force reduction pulse to the coil L1, thereby making it possible to apply the counter-electromotive force reduction pulse at a suitable time.

Figure 14D:
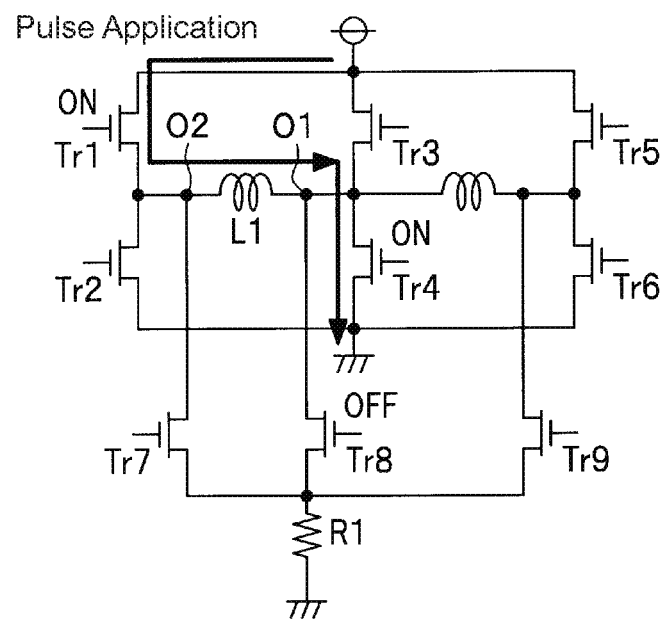

Like in the case illustrated in FIG. 12B, the arrow in FIG. 14D illustrates the current path when a counter-electromotive force reduction pulse is applied to the coil L1.

Initially, the switching elements Tr2 and Tr4 are still in the ON state. Therefore, the counter pulse generation circuit 693 (see FIG. 2) switches OFF the switching element Tr2 and then begins to switch ON the switching element Tr1 at appropriately short intervals. All of the other switching elements are switched OFF. At this time, a current flows in the forward direction from the power supply through the switching element Tr1, the coil L1, and the switching element Tr4. This current corresponds to the counter-electromotive force reduction pulse that applies a braking force to the rotor 48 (see FIG. 3).

Figure 14E:
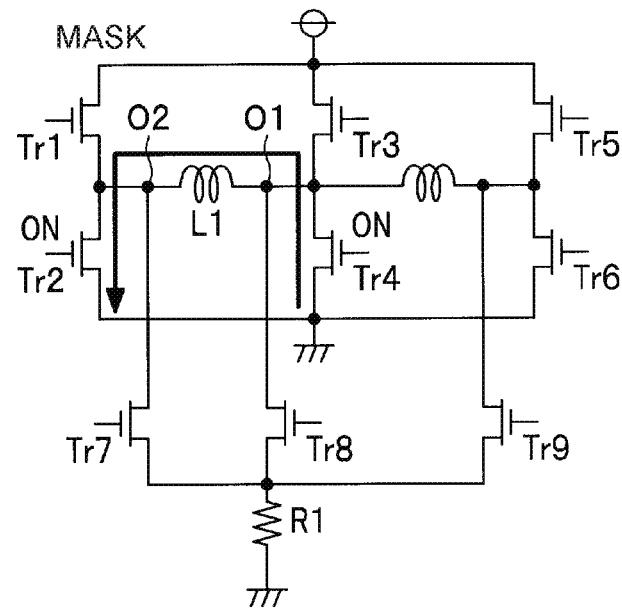

Like in the case in the comparison example illustrated in FIG. 9C, the arrow in FIG. 14E illustrates the current path during the MASK period.

At the beginning of the MASK period, the switching element Tr4 is still in the ON state. The motor controller 69 (see FIG. 2) switches ON the switching element Tr2. All of the other switching elements are switched OFF. When the rotor 48 (see FIG. 3) rotates in the reverse direction, a current is induced in the coil L1 due to the resulting counter-electromotive force. This current flows from the connection point O1 towards the connection point O2 and circulates through the switching elements Tr2 and Tr4.

Figure 14F:
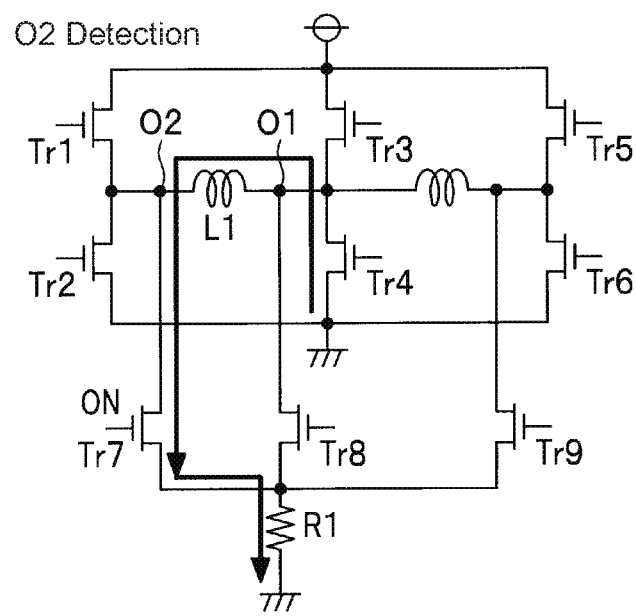

Like FIG. 12E, FIG. 14F illustrates the current path when the current is detected during the O2 detection period.

At the beginning of the O2 detection period, the switching elements Tr2 and Tr4 are still in the ON state. The counter pulse generation circuit 693 (see FIG. 2) switches ON the switching element Tr7 and then begins to switch OFF the switching element Tr2 at appropriately short intervals. All of the other switching elements are switched OFF. FIG. 14F illustrates a state in which the switching element Tr2 is in the OFF state.

When the rotor 48 (see FIG. 3) rotates in the reverse direction, a current is induced in the coil L1 due to the resulting counter-electromotive force. This current flows from the connection point O1 towards the connection point O2 and circulates through the switching element Tr7, the resistor R1, the ground, and the switching element Tr4. The A/D converter 695 (see FIG. 2) measures the terminal voltage of the resistor R1, thereby making it possible to measure the counter-electromotive force.

(Other Modification Examples)

The present invention is not limited to the embodiment and modification example described above, and various modifications can be made without departing from the spirit of the present invention. For example, modifications such as (a) to (c) below are possible.

(a) In the embodiments and modification example described above, the stepping motor 4 is a dual-core motor. However, the present invention is not limited to this configuration and may also be applied to single-coil motors.

(b) In the embodiments and modification example described above, the motor drive device was built into an electronic timepiece 1. However, the present invention is not limited to this application and may be built into any type of device.

(c) In an embodiment described above, the counter-electromotive force reduction pulse is applied as a replacement for one or more of the OPEN periods. However, the present invention is not limited to this scheme.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A motor drive device, comprising:
    a driver unit configured to be connected to a stepping motor; and
    a controller connected to the driver unit,
    wherein the controller causes the driver unit to output a drive pulse to the stepping motor for causing the stepping motor to rotate stepwise in a prescribed rotation direction,
    wherein the controller detects, through the driver unit, a current induced by a counter-electromotive force generated in the stepping motor in response to the drive pulse, in order to determine whether the stepping motor is rotating as intended in response to the drive pulse, and
    wherein the controller causes the driver unit to apply a counter pulse having the same electrical polarity as said drive pulse to the stepping motor so as to suppress an amount of said current induced by said counter-electromotive force when the stepping motor is not rotating in response to the drive pulse so that the amount of said induced current detectably differs between when the stepping motor is rotating and when the stepping motor is not rotating.

2. The motor drive device according to claim 1, wherein the counter pulse is outputted to the stepping motor in such a timing that the counter pulse acts to apply a braking force to a counter rotation of the stepping motor that occurs in a direction opposite to the prescribed rotation direction in response to the drive pulse when the stepping motor is not rotating, said timing being such that the counter pulse acts to enhance a rotation of the stepping motor in the prescribed rotation direction when the stepping motor is rotating in response to the drive pulse.

3. The motor drive device according to claim 2, wherein the controller causes the driver unit to output the counter pulse while the stepping motor generates a counter-electromotive force having a reverse electrical polarity as the drive pulse.

4. The motor drive device according to claim 3,
wherein the driver unit includes a switching element and a resistor, one end of the switching element being configured to be connected to a coil of the stepping motor, and another end of the switching element being grounded via said resistor, and
wherein the controller includes an A/D converter connected to the resistor, and the A/D converter detects a voltage across the resistor to detect a current that flows in said coil.

5. The motor drive device according to claim 3, wherein the controller determines whether the stepping motor has rotated when the electrical polarity of the counter-electromotive force that has been detected is the same as the electrical polarity of the drive pulse signal.

6. An electronic timepiece, comprising:
the motor drive device according to claim 1;
said stepping motor connected to the motor drive device; and
a display unit that displays a time.

7. An electronic timepiece, comprising:
the motor drive device according to claim 2;
said stepping motor connected to the motor drive device; and
a display unit that displays a time.

8. An electronic timepiece, comprising:
the motor drive device according to claim 3;
said stepping motor connected to the motor drive device; and
a display unit that displays a time.

9. An electronic timepiece, comprising:
the motor drive device according to claim 4;
said stepping motor connected to the motor drive device; and
a display unit that displays a time.

10. An electronic timepiece, comprising:
the motor drive device according to claim 5;
said stepping motor connected to the motor drive device; and
a display unit that displays a time.

* * * * *